United States Patent
Dudar

(10) Patent No.: US 10,906,798 B2
(45) Date of Patent: Feb. 2, 2021

(54) SYSTEMS AND METHODS FOR REDUCING SADDLE FUEL TANK DEPRESSURIZATION TIME

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/299,731

(22) Filed: Mar. 12, 2019

(65) Prior Publication Data

US 2020/0290861 A1  Sep. 17, 2020

(51) Int. Cl.
| | |
|---|---|
| *B67D 7/14* | (2010.01) |
| *B60K 15/03* | (2006.01) |
| *B60K 15/035* | (2006.01) |
| *F02M 37/00* | (2006.01) |
| *B67D 7/04* | (2010.01) |
| *B67D 7/36* | (2010.01) |
| *B67D 7/62* | (2010.01) |

(52) U.S. Cl.
CPC ................ *B67D 7/14* (2013.01); *B60K 15/03* (2013.01); *B60K 15/03504* (2013.01); *B60K 15/03519* (2013.01); *B67D 7/0476* (2013.01); *B67D 7/36* (2013.01); *B67D 7/62* (2013.01); *F02M 37/0094* (2013.01); *B60K 2015/0319* (2013.01); *B60K 2015/0325* (2013.01); *B60K 2015/03131* (2013.01); *B60K 2015/03138* (2013.01); *B60K 2015/03144* (2013.01); *B60K 2015/03223* (2013.01); *B60K 2015/03514* (2013.01); *B60K 2015/03576* (2013.01); *B67D 2007/0444* (2013.01)

(58) Field of Classification Search
CPC ...... F02M 37/0094; B60K 2015/03138; B60K 2015/03144; B60K 2015/0319
USPC ............. 141/5; 123/514; 137/127, 255, 395, 137/571; 180/314; 239/127; 244/135 C, 244/172.3
See application file for complete search history.

(56) References Cited

U.S. PATENT DOCUMENTS

| | | | |
|---|---|---|---|
| 9,086,040 | B2 | 7/2015 | Jentz et al. |
| 2013/0255797 | A1 | 10/2013 | Coulon et al. |

FOREIGN PATENT DOCUMENTS

| | | |
|---|---|---|
| EP | 2620310 A1 | 7/2013 |
| WO | 2016168258 A1 | 10/2016 |

*Primary Examiner* — Timothy P. Kelly
*Assistant Examiner* — Christopher M Afful
(74) *Attorney, Agent, or Firm* — Geoffrey Brumbaugh; McCoy Russell LLP

(57) ABSTRACT

Methods and systems are provided for increase a rate at which a saddle fuel tank is depressurized responsive to a request for refueling. In one example, a method may include, responsive to the request for refueling, depressurizing a primary side of the saddle fuel tank to a secondary side of the saddle fuel tank, and commanding open a refueling lock coupled to the primary side to allow fuel to be delivered to the primary side when pressure in the primary side drops below a threshold pressure. In this way, the secondary fuel tank may be maintained at atmospheric pressure prior to the request for refueling, which may increase the rate of depressurization of the saddle fuel tank responsive to the request.

8 Claims, 7 Drawing Sheets

SYSTEMS AND METHODS FOR REDUCING SADDLE FUEL TANK DEPRESSURIZATION TIME

FIELD

The present description relates generally to methods and systems for reducing a time frame in which a saddle fuel tank is depressurized to enable commencement of a refueling event.

BACKGROUND/SUMMARY

Vehicle systems may be equipped with a fuel system including a bifurcated fuel tank for storing and delivering fuel to an internal combustion engine. For example, a fuel tank may include a reserve tank, or the fuel tank may be configured as a saddle tank in order to achieve compact packaging without compromising fuel storage. For example, saddle tanks may be utilized in all wheel drive (AWD) vehicles in which the AWD hardware occupies significant underbody space that is required for packaging a single tank. Further, saddle tanks may be designed to hold more fuel than standard fuel tanks, making them more desirable in vehicle systems that require more fuel storage, such as AWD vehicles.

Bifurcated or otherwise divided fuel tanks may have two or more compartments, including a first, "active" compartment and a second "passive" compartment, that are fluidly coupled. A fuel pump may be directly coupled to the active compartment (and not the passive compartment), the active compartment maintained with fuel via a jet pump that draws fuel from the second compartment to replenish the fuel withdrawn by the fuel pump.

For certain hybrid electric vehicles (HEVs) including but not limited to plug-in hybrid electric vehicles (PHEVs), such saddle fuel tanks may comprise sealed tanks. Specifically, such tanks may be sealed via a fuel tank isolation valve, and may be made of steel to withstand pressures and vacuum builds resulting from diurnal temperature cycles. Vehicles with sealed fuel tanks may further include fuel doors that are locked, so as to prevent the fuel door from being opened to allow refueling when the fuel tank is under pressure. Accordingly, for such tanks, in response to a request for refueling, the fuel tank isolation valve is commanded open and a fuel tank pressure transducer is relied upon for inferring whether fuel tank pressure is below a threshold, at which point the fuel door may be unlocked.

However, certain conditions including but not limited to high ambient temperatures, aggressive driving, significant fuel slosh events, variable levels of loading of a fuel vapor storage canister coupled to the fuel tank, etc., may result in fuel tank depressurization routines that take longer than desired which may lead to customer dissatisfaction. Such issues may be exacerbated for vehicles that include a saddle fuel tank. Specifically, the main factors associated with fuel tank depressurization comprise a size of the vapor space and pressure magnitude. The larger the vapor space, the more time it may take for pressure to reach atmospheric pressure once vented. In a case where one tank of the saddle tank is empty, the empty tank becomes a vapor reservoir which may thus contribute to longer than desired depressurization times in response to requests to refuel.

International Publication Number WO 2016/168258 discloses that it is desirable to allow for proper venting of saddle fuel tanks. Disclosed therein is a saddle fuel tank with a first and a second lobe, with a first vent line having a first vent port located in the first lobe and a second vent line having a second vent port located in the second lobe. A first solenoid is configured to open and close the first vent port while a second solenoid is configured to open and close the second vent port. The first and second vent ports are commanded closed upon the saddle tank reaching a full fuel condition.

However, the inventors herein have recognized potential issues with such an approach. Specifically, there is no disclosure in WO 2016/168258 of how such vent ports may be controlled to allow for fuel tank depressurization in response to refueling requests. Accordingly, the inventors herein have recognized the above-mentioned issues, and have herein developed systems and methods to at least partially address them. In one example, a method comprises in response to a request to refuel a saddle fuel tank that includes a primary side and a secondary side, depressurizing the primary side to the secondary side, and commanding open a refueling lock coupled to the primary side to allow fuel to be delivered to the primary side when pressure in the primary side drops below a threshold pressure responsive to the depressurizing. By depressurizing the primary side to the secondary side, a depressurization rate for the saddle fuel tank may be improved, which may in turn improve customer satisfaction.

In such a method, depressurizing the primary side to the secondary side may include commanding open a first refueling valve included in a conduit that couples the primary side to the secondary side. Such a method may further comprise selectively coupling the secondary side to a fuel vapor storage canister via a second refueling valve, where the request for refueling may further comprise maintaining the second refueling valve in an open configuration during depressurizing the primary side to the secondary side.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
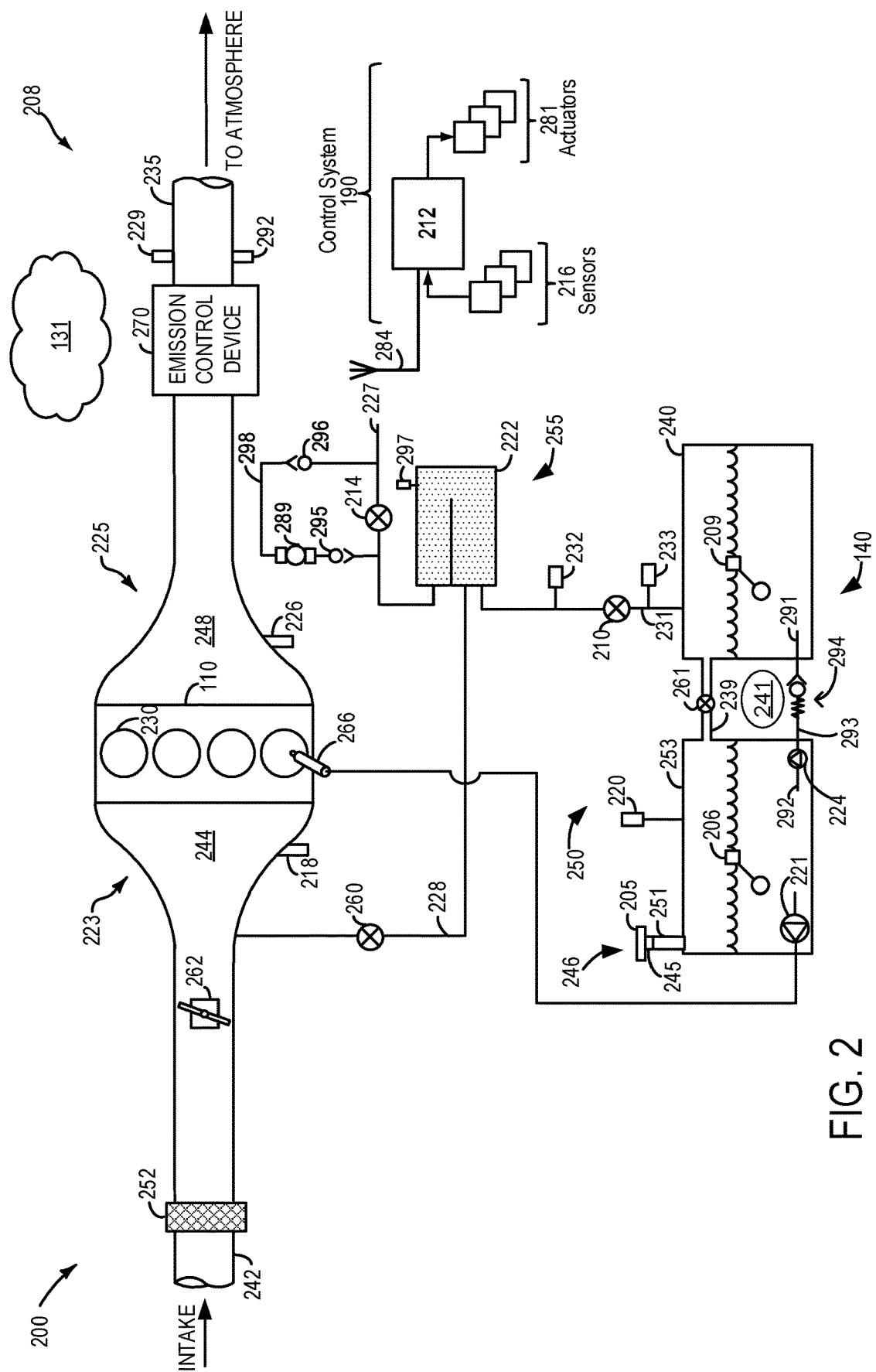
FIG. 2 schematically shows an example engine system with a fuel system that includes a saddle fuel tank and an evaporative emissions system.
Figure 3:
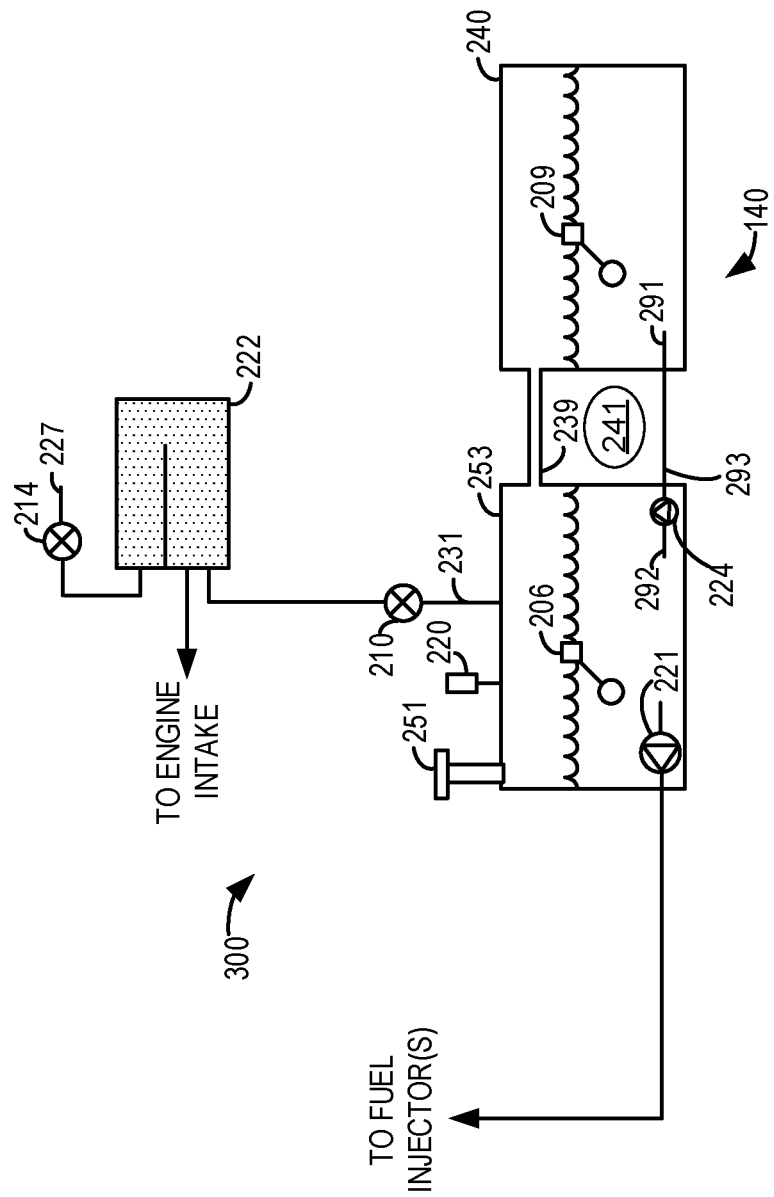
FIG. 3 schematically shows an alternative example of a fuel system that includes a saddle fuel tank, and an evaporative emissions system.
Figure 4:
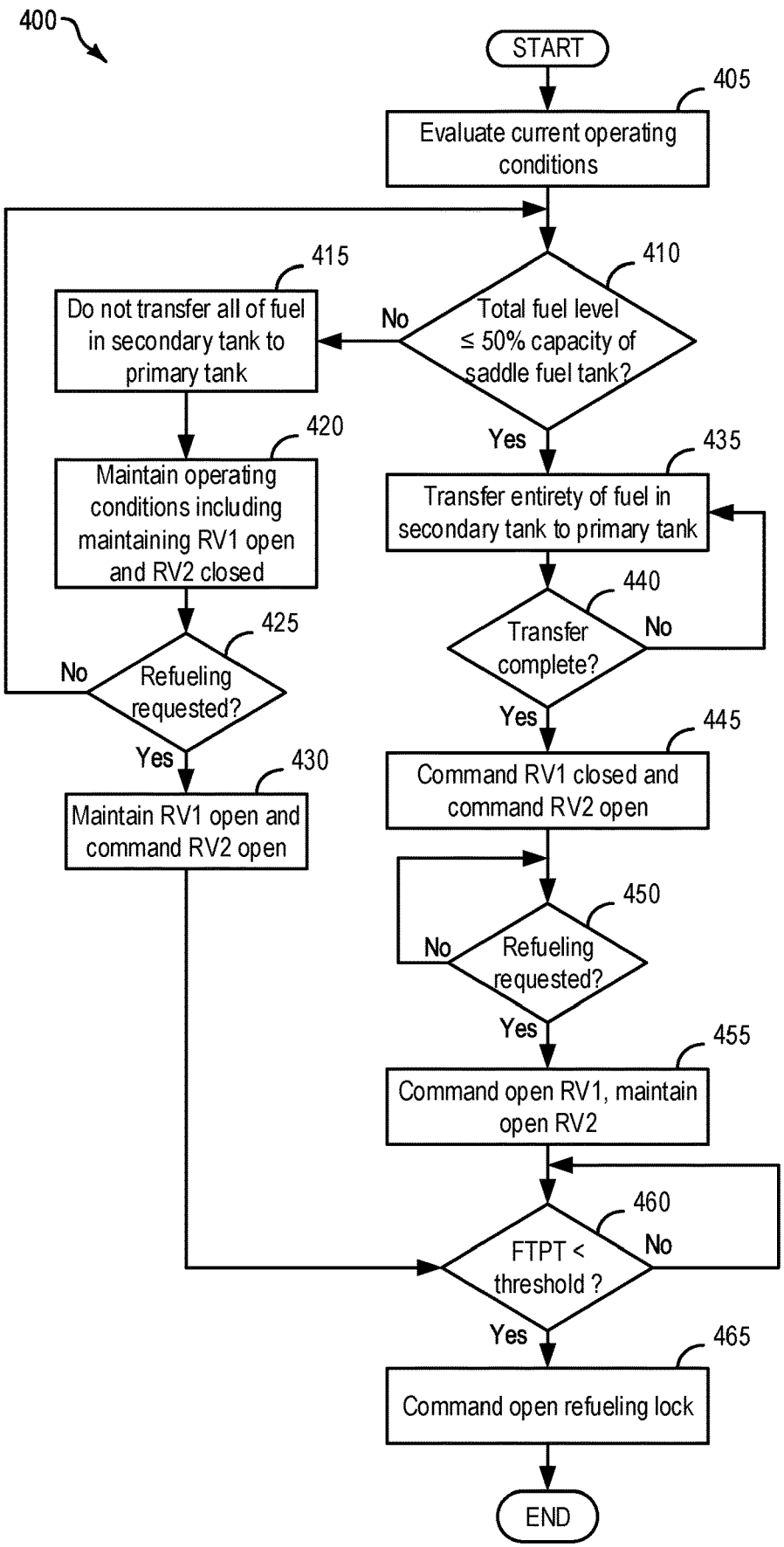
FIG. 4 depicts a high-level example method for controlling allocation of fuel for the saddle fuel tank of FIG. 2, and for conducting fuel tank depressurization routines.
Figure 5:
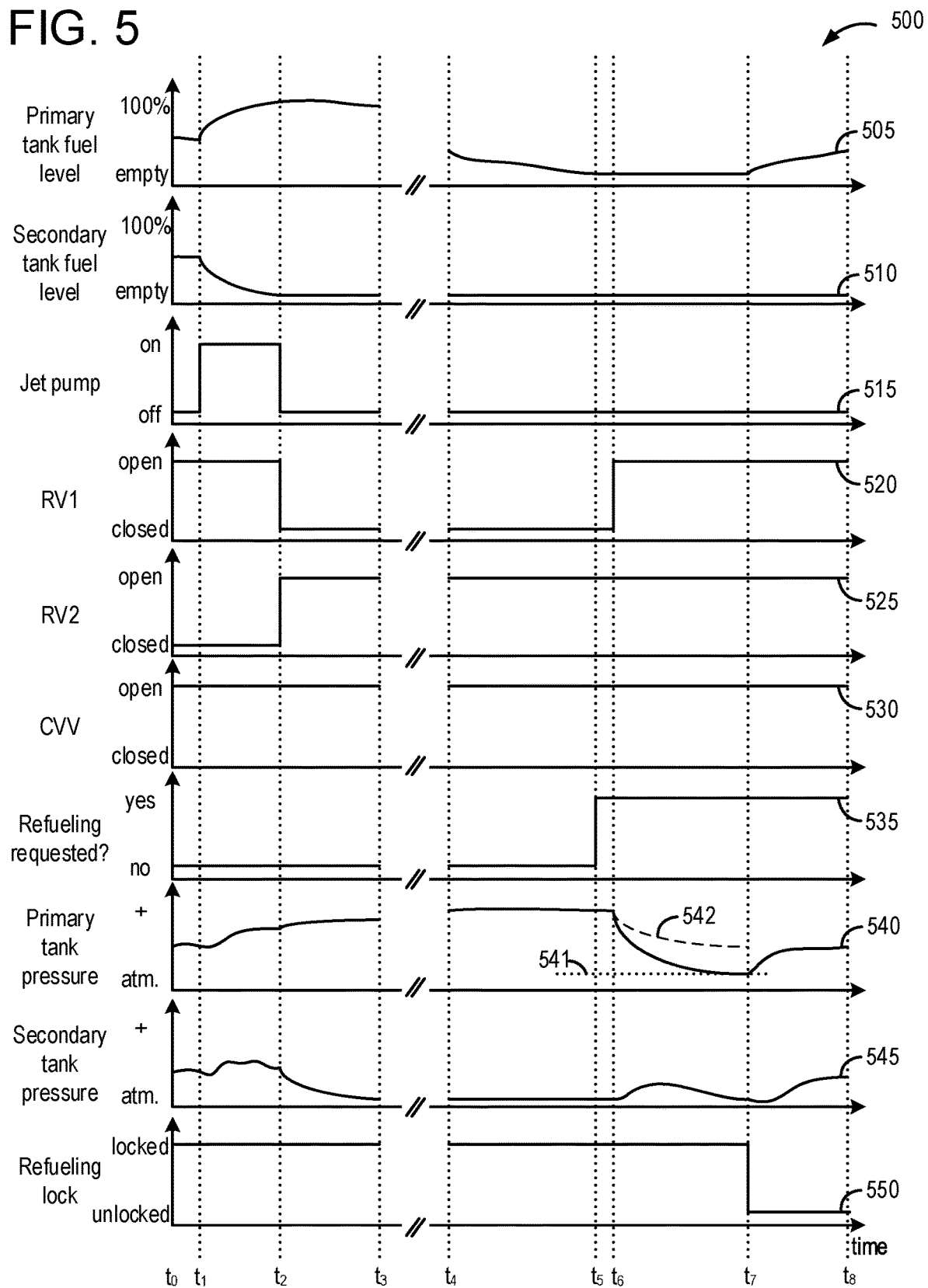
FIG. 5 depicts an example timeline for controlling allocation of fuel and conducting fuel tank depressurization routines, according to the methodology of FIG. 4.
Figure 6:
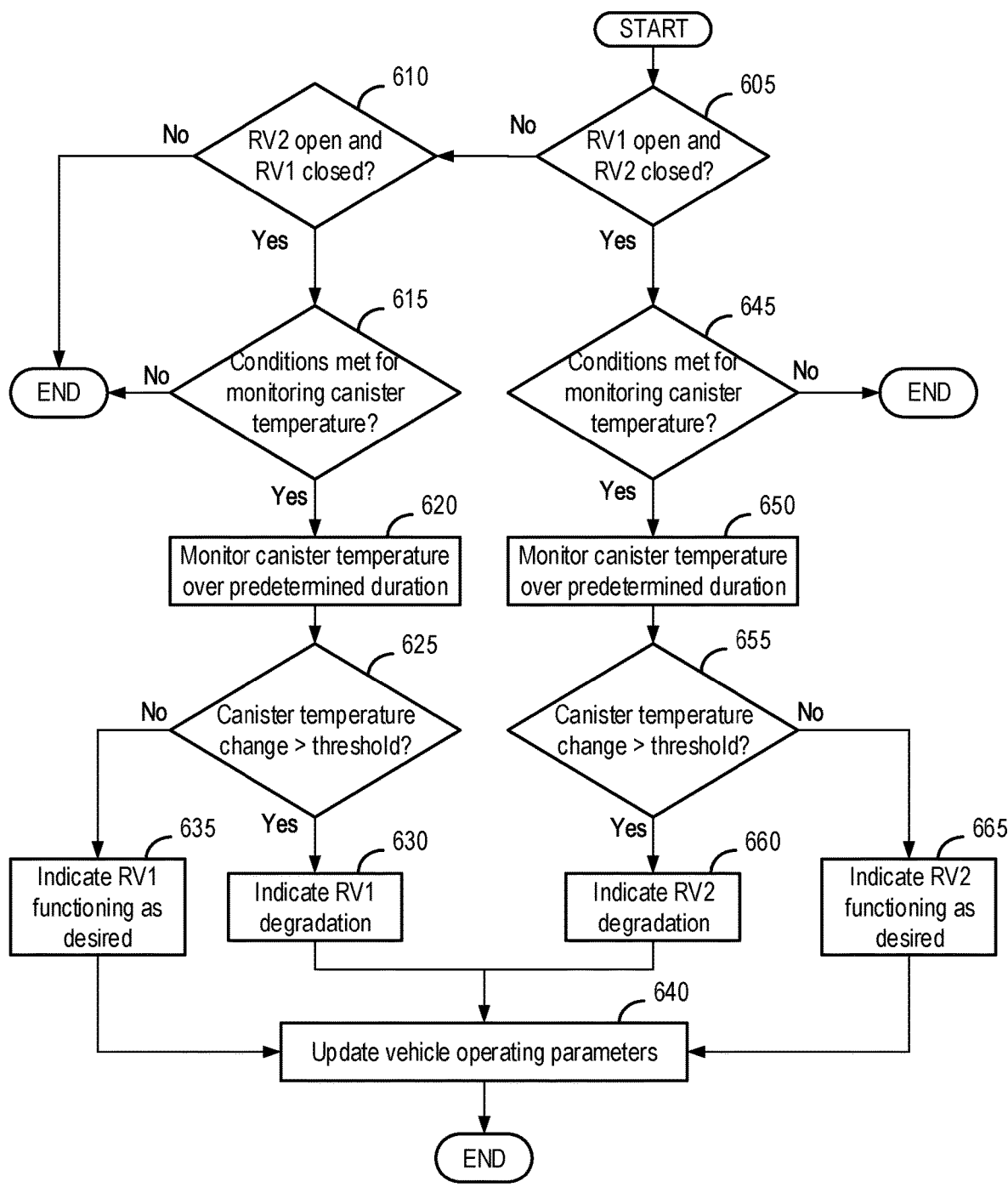
FIG. 6 depicts a high-level example method for determining whether a first refueling valve and/or a second refueling valve of the fuel system of FIG. 2, is degraded.
Figure 7:
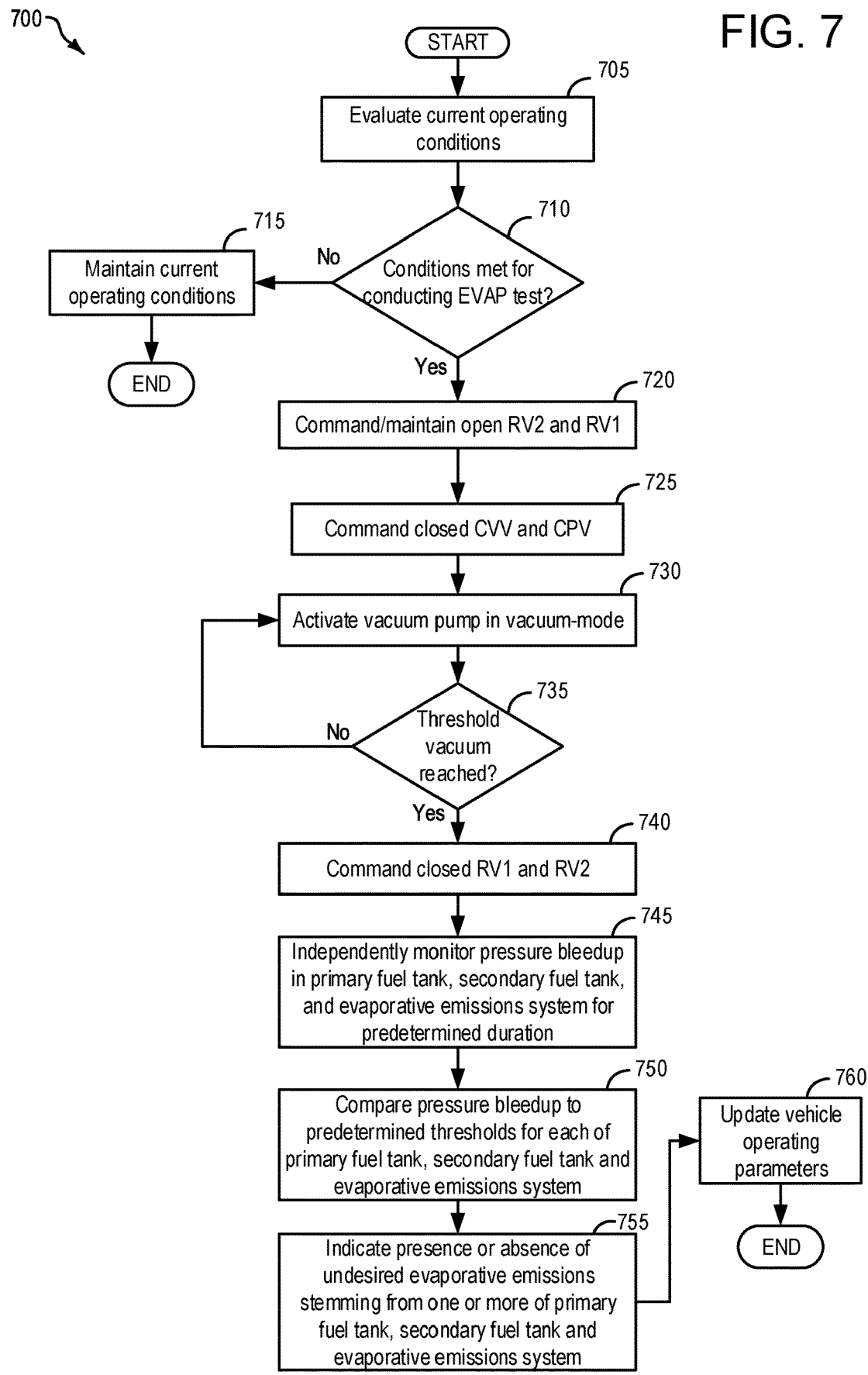
FIG. 7 depicts a high-level example method for conducting a test for a presence or absence of undesired evaporative emissions stemming from the fuel system and/or evaporative emissions system of FIG. 2.

The following description relates to systems and methods for reducing fuel tank depressurization times in response to a request via a vehicle operator to initiate a refueling event. The systems and methods pertain particularly to AWD hybrid electric vehicles with limited engine run-time, such as the hybrid vehicle depicted at FIG. 1. The reduction in fuel tank depressurization times of the present disclosure relate to systems and methods for saddle fuel tanks, such as the saddle fuel tank depicted at FIG. 2. Specifically, by incorporating a first refueling valve for sealing a primary side and a secondary side of the saddle fuel tank, as well as extending a load conduit that includes a second refueling valve from the secondary fuel tank, the load conduit fluidically coupling the secondary fuel tank to a fuel vapor storage canister, methodology discussed herein may be used to prevent the secondary fuel tank from acting as a vapor holding tank, which may thus improve rates of depressurization of the saddle fuel tank such as that depicted at FIG. 2. The saddle fuel tank, fuel system and evaporative emissions system of FIG. 2 is different than another configuration, such as that depicted at FIG. 3, where the configuration depicted at FIG. 3 is not amenable to preventing the secondary fuel tank from acting as a vapor holding tank. Accordingly, by relying on the methodology of FIG. 4 for use with the fuel system and evaporative emissions system depicted at FIG. 2, responsive to requests for fuel tank depressurization, the depressurization may be carried out in a manner which is faster than if a fuel system and evaporative emissions system such as that depicted at FIG. 3 were relied upon. An example timeline for conducting the methodology of FIG. 4 is depicted at FIG. 5. FIG. 6 depicts an example methodology for diagnosing whether the first refueling valve and/or the second refueling valve are degraded, and FIG. 7 depicts example methodology for indicating whether there is a source of undesired evaporative emissions stemming from one or more of the primary fuel tank, secondary fuel tank and/or evaporative emissions system corresponding to FIG. 2.

Figure 1:
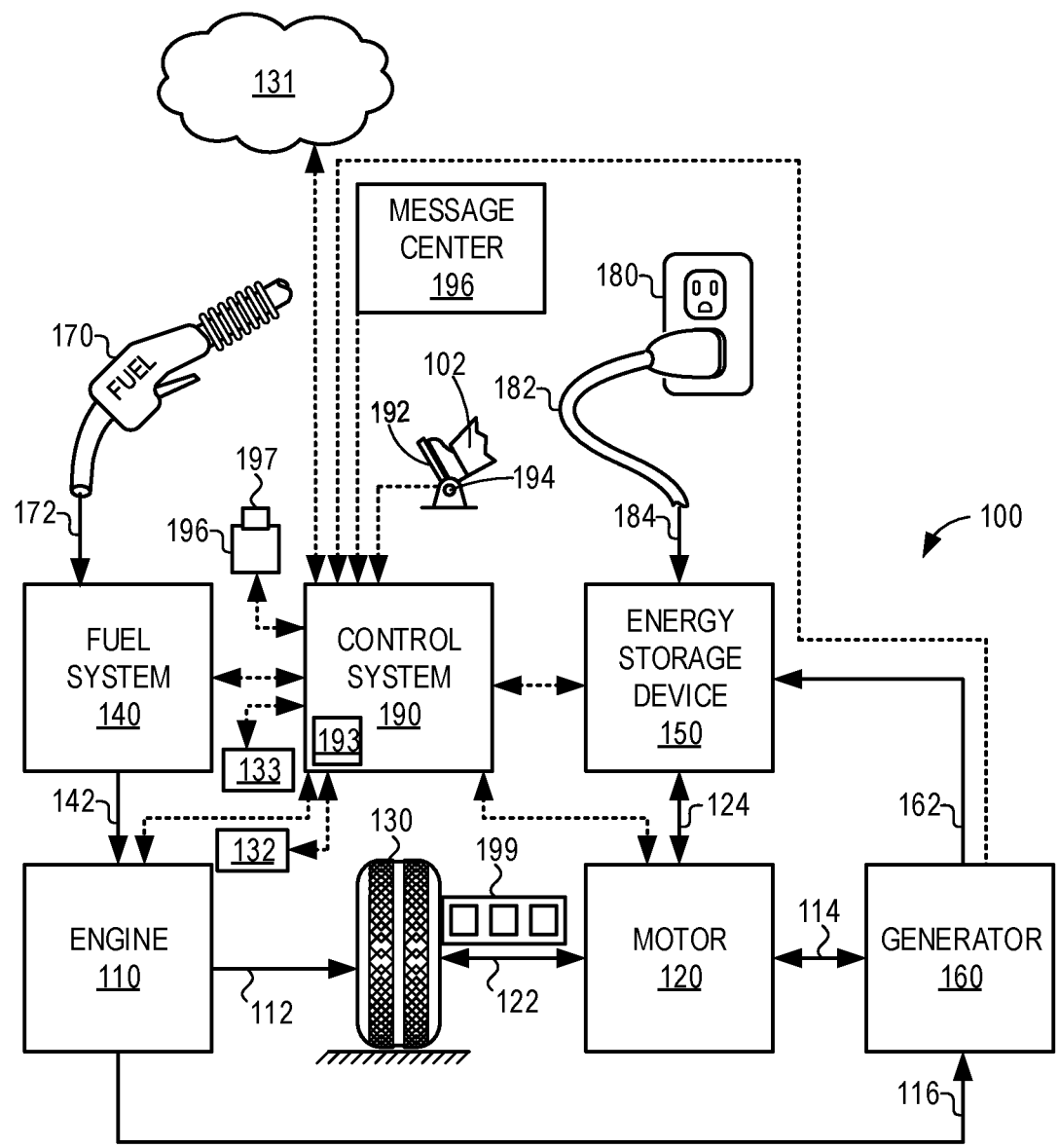
FIG. 1 schematically shows an example vehicle propulsion system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162. In some examples, the motor 120 and generator 160 may comprise a same motor/generator.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks (see FIG. 2) for storing fuel on-board the vehicle. For example, the one or more fuel storage tanks may store one or more liquid fuels, including but not limited to: gasoline, diesel, and alcohol fuels. In some examples, the fuel may be stored on-board the vehicle as a blend of two or more different fuels. For example, fuel system may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it may be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel system 140 may be configured to store the fuel received from fuel dispensing device 170 until it is supplied to engine 110 for combustion. In some examples, control system 190 may receive an indication of the level of fuel stored at fuel system 140 via a fuel level sensor. The level of fuel stored at fuel system 140 (e.g., as identified by the fuel level sensor) may be communicated to the vehicle operator, for example, via a fuel gauge or indication in a vehicle instrument panel 196.

The vehicle propulsion system 100 may also include a roll stability control sensor, such as inertial sensor(s) 199. Inertial sensors 199 may comprise one or more of the following: longitudinal, latitudinal, vertical, yaw, roll, and pitch sensors.

Vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. In other words, vehicle instrument panel may include a human machine interface (HMI) which a user may interact with. As one example, the vehicle instrument panel 196 may include a refueling button 197 which may be manually actuated or pressed by a vehicle operator to initiate refueling. For example, in response to the vehicle operator actuating refueling button 197, the fuel system in the vehicle may be depressurized so that refueling may be performed. In examples where the vehicle comprises an autonomous vehicle, refueling may be initiated under the control of control system 190, where refueling may be initiated without manual actuation of refueling button 197.

Control system 190 may be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 190 may be communicatively coupled to other vehicles or infrastructures via a wireless network 131 and the internet (e.g. cloud), as is commonly known in the art. Specifically, control system 190 may be coupled to a wireless communication device (not shown at FIG. 1 but see 284 at FIG. 2) for direct communication of the vehicle system 100 with wireless network 131. Using wireless communication, the vehicle system 100 may in some examples retrieve data from servers, infrastructures, other vehicles, etc., regarding current and/or upcoming ambient conditions (such as ambient humidity, temperature, pressure, precipitation, wind, etc.), current traffic conditions, etc.

Vehicle system 100 may also include an onboard navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, traffic information, etc. In one example, information received from the GPS may be utilized in conjunction with route learning methodology, such that routes commonly traveled by a vehicle, or commonly traveled by a particular vehicle operator, or commonly traveled by a passenger (in the case of an autonomous vehicle) may be learned by the vehicle control system 190. In some examples, other sensors 133, such as lasers, radar, sonar, acoustic sensors, etc., may be additionally or alternatively utilized in conjunction with the onboard navigation system to conduct route learning of commonly traveled routes by the vehicle. The GPS may in some examples also provide suggested routes for a vehicle to take, depending on current vehicle operating conditions, current traffic conditions, etc.

FIG. 2 shows a schematic depiction of a vehicle system 200 that can derive propulsion power from engine system 208. Vehicle system 200 may be a conventional vehicle powered solely through combustion, or it may be a hybrid vehicle system that can derive propulsion power from engine system 208 and/or an on-board energy storage device (e.g. 150), such as a battery system. An energy conversion device, such as a generator (e.g. 160), may be operated to absorb energy from vehicle motion and/or engine operation, and then convert the absorbed energy to an energy form suitable for storage by the energy storage device.

Engine system 208 may include engine 110 having a plurality of cylinders 230. Engine 110 includes an engine intake 223 and an engine exhaust 225. Engine intake 223 includes an air intake throttle 262 fluidly coupled to the engine intake manifold 244 via an intake passage 242. Air may enter intake passage 242 via air filter 252. Engine exhaust 225 includes an exhaust manifold 248 leading to an exhaust passage 235 that routes exhaust gas to the atmosphere. Engine exhaust 225 may include one or more emission control devices 270 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 208 is a boosted engine system, the engine system may further include a boosting device, such as a turbocharger (not shown).

Engine system 208 is coupled to fuel system 140 and evaporative emissions system 255. Fuel system 140 includes a fuel tank 250 coupled to a fuel pump 221 and evaporative emissions system 255 includes a fuel vapor canister 222. During a fuel tank refueling event, fuel may be pumped into the vehicle from an external source through refueling port 251 that is part of a refueling system 246. Fuel tank 250 may hold a plurality of fuel blends, including fuel with a range of alcohol concentrations, such as various gasoline-ethanol blends, including E10, E85, gasoline, etc., and combinations thereof.

Further, refueling system 246 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve. In such embodiments, refueling lock 245 may not prevent the removal of fuel cap 205. Rather, refueling lock 245 may prevent the insertion of a refueling pump into refueling port 251. In such an example, the refueling lock may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Fuel tank 250 may be configured as a bifurcated fuel tank, or a fuel tank with two or more separate chambers, wherein each chamber is fluidically coupled to at least one other chamber via a conduit. In this example, secondary fuel tank 240 is shown coupled to primary fuel tank 253. Discussed herein, secondary fuel tank 240 may be referred to as passive fuel tank 240, and primary fuel tank 253 may be referred to as active fuel tank 253. Discussed herein, primary fuel tank 253 may also be referred to as "active side" 253, and secondary fuel tank 240 may be referred to as "passive side" 240. Primary fuel tank 253 and secondary fuel tank 240 may be considered a single, saddle fuel tank, which may be configured to be placed over the engine driveline 241. Secondary fuel tank 240 may hold additional fuel that is metered to primary fuel tank 253 via a jet pump 224. Jet pump 224 may transfer fuel from secondary fuel tank 240 to primary fuel tank 253, based on a signal received from controller 212, for example. In some examples, jet pump 224 may be configured to constantly replenish fuel withdrawn from primary fuel tank 253 by fuel pump 221. Jet pump 224 may transfer fuel between secondary fuel tank 240 and primary fuel tank 253 via a conduit or hose 293 coupled to jet pump 224. Jet pump 224 may have an inlet 291 positioned in secondary fuel tank 240 and an outlet 292 positioned in primary fuel tank 253. A check valve 294 may be included in conduit 293 of jet pump 224, to enable fuel to be drawn from secondary fuel tank 240 into primary fuel tank 253 when jet pump 224 is activated, but which prevents fuel and/or fuel vapors from traveling from primary fuel tank 253 to secondary fuel tank 240, when jet pump 224 is off. Further, in some embodiments, jet pump 224 and fuel pump 221 may be combined into a single pump unit.

A first fuel level sensor 206 located in primary fuel tank 253 may provide an indication of the fuel level ("Fuel Level Input") to controller 212. As depicted, fuel level sensor 206 may comprise a float connected to a variable resistor. Alternatively, other types of fuel level sensors may be used.

A conduit 239 may couple primary fuel tank 253 to secondary fuel tank 240 to allow vapors and in some examples fuel to flow between primary fuel tank 253 and secondary fuel tank 240. In some examples, jet pump 224 may transfer fuel between primary fuel tank 253 and secondary fuel tank 240 via a hose or conduit passing through conduit 239. Conduit 239 may include a first refueling valve (RV1) 261. RV1 261 may comprise a valve actuatable open or closed under control of controller 212. Accordingly, RV1 may comprise a solenoid valve, a butterfly valve, a flapper valve, etc. During certain vehicle maneuvers or other conditions that may cause fuel sloshing, fuel from primary fuel tank 253 may flow into secondary tank 240, or vice-versa via conduit 239, provided RV1 is open. Fuel may in some examples also flow between primary fuel tank 253 and secondary tank 240 (or vice-versa) via conduit 239 when the vehicle is traversing a steep gradient, under conditions where RV1 is commanded open. In some examples, during refueling, upon primary fuel tank 253 reaching full capacity and with RV1 open, fuel may flow from primary fuel tank 253 into secondary fuel tank 240 via conduit 239. In some examples, jet pump 224 may mediate fuel transfer between primary fuel tank 253 and secondary fuel tank 240 during refueling events. A second fuel level sensor 209 located in secondary fuel tank 240 may provide an indication of the fuel level ("Fuel Level Input") in secondary fuel tank 240 to controller 212. As depicted, fuel level sensor 209 may comprise a float connected to a variable resistor. Alternatively, other types of fuel level sensors may be used. Further, vehicle system 200 may include an overall fuel level indicator (not shown) that indicates an average of an output of first fuel level indicator 206 and second fuel level indicator 209.

Fuel pump 221 is configured to pressurize fuel delivered to the injectors of engine 110, such as example injector 266. While only a single injector 266 is shown, additional injectors are provided for each cylinder. It will be appreciated that fuel system 140 may be a return-less fuel system, a return fuel system, or various other types of fuel system. Vapors generated in fuel tank 253 and/or 240 may be routed to fuel vapor canister 222, via load conduit 231, before being purged to the engine intake 223. From the illustration depicted at FIG. 2, it may be understood that load conduit 231 extends from secondary fuel tank 240, and not from primary fuel tank 253.

Fuel vapor canister 222 may be filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 222 may be purged to engine intake 223 via purge line 228 by opening canister purge valve 260. While a single canister 222 is shown, it will be appreciated that fuel system 140 may include any number of canisters. One or more temperature sensors 297 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and canister load may be estimated based on temperature changes within the canister.

Canister 222 includes a vent 227 for routing gases out of the canister 222 to the atmosphere when storing, or trapping, fuel vapors from fuel tank 250. Vent 227 may also allow fresh air to be drawn into fuel vapor canister 222 when purging stored fuel vapors to engine intake 223 via purge line 228 and purge valve 260. While this example shows vent 227 communicating with fresh, unheated air, various modifications may also be used. Vent 227 may include a canister vent valve 214 to adjust a flow of air and vapors between canister 222 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister.

If vehicle system 200 is a hybrid vehicle, it may have reduced engine operation times due to the vehicle being powered by engine system 208 during some conditions, and by the energy storage device (e.g. 150) under other conditions. While the reduced engine operation times reduce overall carbon emissions from the vehicle, they may also lead to insufficient purging of fuel vapors from the vehicle's emission control system. To address this, a fuel tank isolation valve 210 may be optionally included in load conduit 231 such that fuel tank 250 is coupled to canister 222 via the fuel tank isolation valve. Discussed herein, fuel tank isolation valve 210 may also be referred to as second refueling valve 210 (RV2). Under certain conditions, which will be elaborated upon further below, RV2 210 may be kept closed to limit the amount of diurnal or "running loss" vapors directed to canister 222 from fuel tank 250. During other conditions, isolation valve 210 may be commanded open. As an example, during refueling operations, and selected purging conditions, isolation valve 210 may be temporarily opened, e.g., for a duration, to direct fuel vapors from the fuel tank 250 to canister 222. By opening the valve during purging conditions when the fuel tank pressure is higher than a threshold (e.g., above a mechanical pressure limit of the fuel tank above which the fuel tank and other fuel system components may incur mechanical damage), the fuel tank vapors may be released into the canister and the fuel tank pressure may be maintained below pressure limits. While the depicted example shows isolation valve 210 positioned along load conduit 231, in alternate embodiments, the isolation valve may be mounted on secondary fuel tank 240. As will be discussed in further detail below, RV2 210 may be controlled as a function of fuel level in secondary fuel tank 240, along with RV1 261. It may be understood that RV2 may comprise a latchable valve, for example RV2 may latch open and/or latch closed. Similarly, RV1 may comprise a latchable valve, for example RV1 may latch open and/or latch closed. In this way, the amount of battery power required to maintain RV1 and/or RV2 may be reduced.

Pressure sensor 220 may be coupled to fuel system 140 for providing an estimate of a fuel system pressure. In one example, the fuel system pressure is a fuel tank pressure, wherein pressure sensor 220 is a fuel tank pressure transducer (FTPT) coupled to fuel tank 253 for estimating a fuel tank pressure or vacuum level. In some examples, a second pressure sensor (not shown) may be coupled to secondary fuel tank 240 for estimating a fuel tank pressure or vacuum level.

Fuel vapors released from canister 222, for example during a purging operation, may be directed into engine intake manifold 244 via purge line 228. The flow of vapors along purge line 228 may be regulated by canister purge valve (CPV) 260, coupled between the fuel vapor canister and the engine intake. The quantity and rate of vapors released by CPV 260 may be determined by the duty cycle of an associated CPV solenoid (not shown). As such, the duty cycle of the CPV solenoid may be determined by the vehicle's powertrain control module (PCM), such as controller 212, responsive to engine operating conditions, including, for example, engine speed-load conditions, an air-fuel ratio, a canister load, etc. By commanding CPV 260 to be closed, the controller may seal the fuel vapor recovery system from the engine intake. An optional canister check valve (not shown) may be included in purge line 228 to prevent intake manifold pressure from flowing gases in the opposite direction of the purge flow. As such, the check valve may be necessary if the canister purge valve control is not accurately timed or the CPV itself can be forced open by a high intake manifold pressure. An estimate of the manifold absolute pressure (MAP) or manifold vacuum (ManVac) may be obtained from MAP sensor 218 coupled to intake manifold 244 and communicated with controller 212. Alternatively, MAP may be inferred from alternate engine operating conditions, such as mass air flow (MAF), as measured by a MAF sensor (not shown) coupled to the intake manifold.

Fuel system 140 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open RV1 261 and RV2 210 while closing CPV 260 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open RV1 261 and RV2 210, while maintaining CPV 260 closed, to depressurize the fuel tank before allowing fuel to be added therein. As such, RV1 261 and RV2 210 may be kept open during the refueling operation to allow refueling vapors to be stored in the canister. After refueling is completed, RV2 210 may be closed.

Returning to the discussion on operating modes of the fuel system, as yet another example, the fuel system may be operated in a canister purging mode (e.g., after an emission control device light-off temperature has been attained and with the engine running), wherein the controller 212 may open CPV 260 while closing RV2 210. Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine.

Controller 212 may also be configured to intermittently perform diagnostic routines for presence or absence of undesired evaporative emissions on fuel system 140 to confirm that the fuel system is not degraded. As such, such diagnostic routines may be performed while the vehicle is running with the engine on (e.g., during an engine mode of hybrid vehicle operation) or with the engine off (e.g., during a battery mode of hybrid vehicle operation). Specifically, in situations where the engine is running, engine intake manifold vacuum may be used to apply a vacuum on a fuel system (by commanding open the CPV) and/or evaporative emissions system that is sealed from atmosphere (by closing the CVV), and once the desired vacuum is attained, the fuel system and/or evaporative emissions system may be sealed from engine intake (by commanding closed the CPV) and pressure bleedup may be monitored. Pressure bleedup that remains below a preset pressure threshold and/or pressure bleedup that bleeds up at a rate lower than a threshold bleedup rate, may be indicative of an absence of a source of undesired evaporative emissions stemming from the fuel system.

However, because engine run time may be limited, particularly for hybrid vehicles, a vacuum pump 289 configured to apply a negative pressure with respect to atmospheric pressure on the fuel system and/or evaporative emissions system may be included. Specifically, vacuum pump 289 may be configured in a vacuum pump conduit 298. The vacuum pump may comprise a rotary vane pump, a diaphragm pump, a liquid ring pump, a piston pump, a scroll pump, a screw pump, a wankel pump, etc., and may be understood to be in parallel with the CVV 214. The vacuum pump conduit 298 may be configured to route fluid flow (e.g. air and fuel vapors) from vent line 227, around canister vent valve 214. Vacuum pump conduit 298 may include a first check valve (CV1) 295, and second check valve (CV2) 296. When the vacuum pump 289 is activated in a vacuum-mode, air may be drawn from vent line 227 between canister 222 and CVV 214, through vacuum pump conduit 298, back to vent line 227 at a position between canister vent valve 214 and atmosphere. In other words, the vacuum pump may be activated to evacuate the evaporative emissions system 255, and may further evacuate fuel system 140, as a function of a status of RV2 210 and RV1 261, as will be discussed in further detail below. CV1 295 may comprise a pressure/vacuum-actuated valve that may open responsive to activating the vacuum pump to evacuate the fuel system and/or evaporative emissions system, and which may close responsive to the vacuum pump 289 being deactivated, or turned off. Similarly, CV2 may comprise a pressure/vacuum-actuated valve. When the vacuum pump 289 is activated to evacuate the fuel system and/or evaporative emissions system, CV2 296 may open to allow fluid flow to be routed from vacuum pump conduit 298 to atmosphere, and which may close responsive to the vacuum pump 289 being turned off. It may be understood that CVV 214 may be commanded closed in order to evacuate the fuel system and/or evaporative emissions system via the vacuum pump 289.

In the vehicle system 200 where the vacuum pump 289 is included, calibrations may be utilized in order to determine vacuum thresholds for indicating a presence or absence of undesired evaporative emissions. For example, there may be a 3D lookup table stored at the controller, which may enable determination of thresholds as a function of ambient temperature and/or fuel level.

In the example vehicle system 200, a pressure sensor 232 may be included, positioned in load conduit 231. Thus, it may be understood that when RV2 210 is closed, vacuum pump 289 or the engine may be used to evacuate the evaporative emissions system and may rely on pressure sensor 232 for monitoring pressure bleedup to indicate a presence or absence of undesired evaporative emissions stemming from the evaporative emissions system.

In another example, RV2 210 may be commanded or maintained open while RV1 261 may be commanded or maintained closed. In this way, vacuum pump 289 or the engine may be used to evacuate secondary fuel tank 240 to a desired vacuum, at which point RV2 210 may be commanded closed and pressure bleedup monitored in secondary fuel tank 240 via pressure sensor 233. In this way, secondary fuel tank 240 may be analyzed for presence or absence of undesired evaporative emissions independently from primary fuel tank 253 and evaporative emissions system 255.

In still another example, RV2 210 may be commanded open along with RV1 261, and vacuum pump 289 or the engine may be used to evacuate primary fuel tank 253 (along with secondary fuel tank 240) to the desired vacuum. Then, if RV1 261 is closed, pressure bleedup in the primary fuel tank 253 may be monitored via pressure sensor 220, to indicate the presence or absence of undesired evaporative emissions. In this way, primary fuel tank 253 may be analyzed for presence or absence of undesired evaporative emissions independently from secondary fuel tank 240 and evaporative emissions system 255.

In another example, each of the primary fuel tank 253, secondary fuel tank 240, and evaporative emissions system 255 may each be monitored simultaneously for presence or absence of a source of undesired evaporative emissions.

Specifically, with RV2 210 and RV1 261 open and with CVV 214 closed, vacuum pump 289 may be used to evacuate the evaporative emissions system, and both the primary and secondary fuel tanks, to a desired vacuum. Upon reaching the desired vacuum, RV1 and RV2 may be commanded closed, and vacuum pump 289 may be deactivated. Pressure bleedup may then be independently monitored for each of primary fuel tank 253 (via pressure sensor 220), secondary fuel tank 240 (via pressure sensor 233), and evaporative emissions system (via pressure sensor 232). While the above example relies on the vacuum pump for evacuating the fuel system and evaporative emissions system, it may be understood that the engine may be used for the evacuating in other examples, by commanding open the CPV to apply engine intake vacuum on the fuel system and/or evaporative emissions system, and in response to the desired vacuum being reached, commanding closed the CPV to seal the evaporative emissions system and fuel system from engine intake.

The controller 212 may be coupled to a wireless communication device 284 for direct communication of the control system 190 and vehicle system 200 with wireless network 131, as mentioned above.

Vehicle system 200 may further include control system 190. Control system 190 is shown receiving information from a plurality of sensors 216 (various examples of which are described herein) and sending control signals to a plurality of actuators 281 (various examples of which are described herein). As one example, sensors 216 may include exhaust gas sensor 226 located upstream of the emission control device, temperature sensor 299, MAP sensor 218, pressure sensor 229, first fuel level sensor 206, second fuel level sensor 209, and fuel tank pressure sensor 220. Other sensors such as additional pressure, temperature, air/fuel ratio, and composition sensors may be coupled to various locations in the vehicle system 200. As another example, the actuators may include fuel injector 266, RV1 261, RV2 210, purge valve 260, vent valve 214, fuel pump 221, jet pump 224, vacuum pump 289, and throttle 262. The control system 190 may include a controller 212. The controller may receive input data from the various sensors, process the input data, and trigger the actuators in response to the processed input data based on instruction or code programmed therein corresponding to one or more routines. For example, controller 212 receives signals from the various sensors of FIG. 2 and employs the various actuators of FIG. 2 to adjust engine operation based on the received signals and instructions stored on a memory of the controller. Example control routines are described herein with regard to FIG. 4 and FIGS. 6-7.

Thus, discussed herein, secondary fuel tank 240 includes load conduit 231 stemming therefrom, where secondary fuel tank 240 is selectively coupled to fuel vapor storage canister 222 via RV2 210, and selectively coupled to primary fuel tank 253 via RV1 261. As will be elaborated in further detail below, such a configuration may enable faster depressurization routines of a saddle fuel tank (e.g. 250), in response to a request for refueling, as opposed to other configurations where the primary fuel tank (e.g. 253) is selectively coupled to a canister (e.g. 222) via a load conduit (e.g. 231) stemming from the primary fuel tank (e.g. 253).

Specifically, turning to FIG. 3, depicted is an example of a saddle fuel tank 300 that is different than saddle fuel tank 250 depicted at FIG. 2. For convenience, components that are similar in nature to the components of FIG. 2 are depicted by the same numerals at FIG. 3 as those depicted at FIG. 2. However, it may be understood that saddle fuel tank 300 is different than saddle fuel tank 250, for the following reasons. Specifically, load conduit 231 of saddle fuel tank 300 stems from primary fuel tank 253, as opposed to stemming from secondary fuel tank 240 as depicted at FIG. 2. Furthermore, saddle fuel tank 300 does not include RV1 (e.g. 261), nor the check valve (e.g. 294) associated with the jet pump (e.g. 224). In such an example (FIG. 3), it may be understood that fuel vapors from primary fuel tank 253 may freely flow between primary fuel tank 253 and secondary fuel tank 240, via conduit 239. Jet pump 224 may draw fuel from secondary fuel tank 240 to primary fuel tank 253, and thus as the secondary fuel tank 240 becomes depleted of fuel, secondary fuel tank 240 essentially becomes a vapor holding tank for vapors generated in primary fuel tank 253, when isolation valve 210 is closed. Because the main time constants for fuel tank depressurization comprise size of vapor holding space and pressure magnitude, when secondary fuel tank 240 acts as a vapor holding tank for primary fuel tank 253, responsive to a request for refueling where control logic commands open isolation valve 210 to depressurize saddle fuel tank 300, depressurization rate may be a function of vapor pressure in primary fuel tank 253 as well as secondary fuel tank 240. Alternatively, as will be elaborated in further detail below, by configuring a saddle fuel tank (e.g. 250) as depicted at FIG. 2, with load conduit 231 that includes RV2 210 stemming from secondary fuel tank 240, and further including RV1 261 and check valve 294, secondary fuel tank 240 may be prevented from acting as a vapor holding tank for primary fuel tank 253, which may thus enable faster saddle fuel tank depressurization routines for fuel tanks as depicted as at FIG. 2, compared to longer depressurization routines for fuel tanks configured as depicted at FIG. 3. Briefly, for saddle fuel tanks as that depicted at FIG. 2, control logic may seal secondary fuel tank 240 from primary fuel tank 253 when secondary fuel tank 240 is depleted of fuel by closing RV1 261, and may additionally couple secondary fuel tank 240 to canister 222 via commanding open RV2 210. Accordingly, secondary fuel tank 240 may be maintained at atmospheric pressure when empty, such that a request for refueling may include commanding open RV1 261 and maintaining open RV2 210. In this way, secondary fuel tank 240 may be prevented from acting as a vapor holding tank for primary fuel tank 253, which may improve rates at which saddle fuel tank 250 (refer to FIG. 2) is depressurized as compared to a saddle fuel tank such as saddle fuel tank 300 depicted at FIG. 3.

Accordingly, the systems of FIGS. 1-2 may enable a system for a vehicle comprising a saddle fuel tank including a primary side and a secondary side, the primary side further including a refueling port and a refueling lock that, when locked, prevents fuel from being added to the primary side via the refueling port. Such a system may further include a fuel tank pressure sensor for monitoring pressure in the primary side. Such a system may further include a controller with computer readable instructions stored on non-transitory memory that when executed, cause the controller to, in response to receiving a request to refuel the saddle fuel tank, command the primary side fluidically coupled to the secondary side to depressurize the primary side, monitor the pressure in the primary side, and unlock the refueling lock in response to the pressure in the primary side becoming within a threshold pressure of atmospheric pressure.

Such a system may further comprise a first refueling valve included in a conduit that couples the primary side to the secondary side. For such a system, the controller may store further instructions to command open the first refueling valve to fluidically couple the primary side to the secondary side to depressurize the primary side.

Such a system may further comprise a load conduit stemming from the secondary side that couples the secondary side to a fuel vapor storage canister, the load conduit further including a second refueling valve. For such a system, the controller may store further instructions to maintain open the second refueling valve responsive to receiving the request for refueling.

Such a system may further comprise a jet pump for transferring fuel from the secondary side to the primary side, the jet pump further comprising a check valve that closes to prevent fuel and/or vapors from being transferred from the primary side to the secondary side when the jet pump is off. Such a system may further comprise a first fuel level sensor positioned in the primary side and a second fuel level sensor positioned in the secondary side. For such a system, the controller may store further instructions to, prior to receiving the request to refueling the saddle fuel tank, monitor a first fuel amount in the primary side and a second fuel amount in the secondary side, and activate the jet pump to transfer all of the second fuel amount to the primary side when it is indicated that all of the second fuel amount can be transferred to the primary side without overwhelming a capacity of the primary side.

Turning now to FIG. 4, a high-level flowchart for an example method 400 for controlling allocation of fuel between a primary fuel tank (e.g. 253) and a secondary fuel tank (e.g. 240) of a saddle fuel tank (e.g. 250) such as that depicted at FIG. 2, and conducting a depressurization routine of such a saddle fuel tank responsive to a request for refueling, is shown. Specifically, method 400 includes transferring an entirety of fuel from the secondary fuel tank to the primary fuel tank when it is indicated that all of the fuel from the secondary fuel tank can be transferred to the primary fuel tank without overwhelming a capacity of the first fuel tank. Once transferred, method 400 may include sealing the primary fuel tank from the secondary fuel tank, and fluidically coupling the secondary fuel tank to a fuel vapor storage canister that it fluidically coupled to atmosphere. In this way, the secondary fuel tank may be prevented from acting as a vapor holding tank when empty, which may increase a rate at which such a saddle fuel tank is depressurized responsive to a request to refuel the saddle fuel tank (e.g. 250).

Method 400 will be described with reference to the systems described herein and shown in FIGS. 1-2, though it will be appreciated that similar methods may be applied to other systems without departing from the scope of this disclosure. Instructions for carrying out method 400 and the rest of the methods included herein may be executed by a controller, such as controller 212 of FIG. 2, based on instructions stored in non-transitory memory, and in conjunction with signals received from sensors of the engine system, such as temperature sensors, pressure sensors, and other sensors described in FIGS. 1-2. The controller may employ actuators such as RV1 (e.g. 261), RV2 (e.g. 210), CVV (e.g. 214), CPV (e.g. 260), jet pump (e.g. 224), etc., to alter states of devices in the physical world according to the methods depicted below.

Method 400 begins at 405, and may include evaluating current vehicle operating conditions. Operating conditions may be estimated, measured, and/or inferred, and may include one or more vehicle conditions, such as vehicle speed, battery state of charge, etc., various engine conditions, such as engine status (on or off), engine load, engine temperature, engine speed, torque demand, exhaust air-fuel ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 410, method 400 may include indicating whether a total fuel level (e.g. total amount of fuel in both the primary fuel tank and the secondary fuel tank) for the saddle fuel tank is less than or equal to 50% of a total capacity (e.g. capacity of the primary fuel tank plus the capacity of the secondary fuel tank) of the saddle fuel tank. In such an example, it may be understood that the capacity of the primary fuel tank is substantially similar (e.g. within 5% or less, or within 1% or less) to the capacity of the secondary fuel tank. Thus, said another way, at 410 it may be determined as to whether an entirety of an amount of fuel stored in the secondary fuel tank may be transferred to the primary fuel tank, without overwhelming the capacity of the first fuel tank. In other words, at 410 method 400 includes determining whether all of the fuel stored in the secondary fuel tank may be transferred to the primary fuel tank, such that upon transferring all of the fuel stored in the secondary fuel tank to the primary fuel tank, the level of fuel in the primary fuel tank is equal to or less than a full fuel level (e.g. 100% full, or in other words, at capacity).

If, at 410 it is indicated that the entirety of fuel in the secondary fuel tank cannot be transferred to the primary fuel tank without resulting in fuel level in the primary fuel tank being greater than 100% full, then method 400 may proceed to 415. At 415, method 400 may include not transferring the entirety of fuel from the secondary fuel tank to the primary fuel tank. Continuing to 420, method 400 may include maintaining current operating conditions. Specifically, it may be understood that when there is fuel in both the primary fuel tank and the secondary fuel tank, where the entirety of fuel in the secondary fuel tank cannot be transferred to the primary fuel tank without overwhelming the capacity of the primary fuel tank, RV1 (e.g. 261) may be commanded to an open configuration, whereas RV2 (e.g. 210) may be commanded to a closed configuration. In this way, fuel vapors may freely travel between the primary fuel tank and the secondary fuel tank, and both the primary fuel tank and the secondary fuel tank may be sealed from atmosphere due to the RV2 being closed. In this way, fuel vapors may be prevented from loading the canister when there is fuel stored in both the primary fuel tank and the secondary fuel tank.

Proceeding to 425, method 400 may include indicating whether a request to refuel the saddle fuel tank is indicated. Specifically, such a request may be received at the controller via the vehicle operator pressing a refueling button on the vehicle dash. If such a refueling request is not received, then method 400 may continue to monitor as to whether conditions are met for transferring the entirety of fuel stored in the secondary fuel tank to the primary fuel tank.

Alternatively, returning to 425, responsive to a request for refueling being received at the controller, method 400 may proceed to 430. At 430, method 400 may include maintaining RV1 (e.g. 261) open, and commanding open RV2 (e.g. 210). By commanding open RV2, the secondary fuel tank may be fluidically coupled to the canister and to atmosphere (via the open CVV). Further, because RV1 is open, the primary fuel tank may too be fluidically coupled to the canister and to atmosphere, via fluidic communication between the primary fuel tank and the secondary fuel tank, the secondary fuel tank fluidically coupled to the canister. In this way, with the primary fuel tank and the secondary fuel tank coupled to atmosphere, the saddle fuel tank may be depressurized.

Accordingly, proceeding to 460, method 400 may include indicating as to whether pressure in the primary fuel tank has dropped below a predetermined pressure threshold (e.g. within 5% or less of atmospheric pressure, or within 1% or less of atmospheric pressure). If not, method 400 may continue to maintain open RV1 and RV2, and may continue to monitor pressure in the primary fuel tank. Once pressure in the primary fuel tank is indicated to drop below the predetermined pressure threshold, method 400 may proceed to 465. At 465, method 400 may include commanding open the refueling lock (e.g. 245) via the controller sending a signal to an actuator of the refueling lock, thus commanding it unlocked. While method 400 includes commanding open the refueling lock under control of the controller, it may be understood that in other examples, the refueling lock may comprise a pressure-based mechanical actuator that mechanically opens when pressure drops below the predetermined pressure threshold, without departing from the scope of this disclosure.

Once the refueling lock has been actuated open, it may be understood that fuel may be added to the primary fuel tank via the refueling port (e.g. 251) coupled to the primary fuel tank. While not explicitly illustrated, it may be understood that during refueling the saddle fuel tank, both RV1 and RV2 may be maintained open. Method 400 may then end.

Returning to 410, responsive to an indication that the entirety of fuel stored in the secondary fuel tank may be transferred to the primary fuel tank, method 400 may proceed to 435. At 435, method 400 may include activating the jet pump (e.g. 224) to draw fuel from the secondary fuel tank for placement into the primary fuel tank. In some examples, RV2 may be commanded open during the transfer of fuel (with RV1 also open), however in other examples RV2 may be maintained closed during the transfer of fuel.

Proceeding to 440, method 400 may include indicating as to whether the transfer of the entirety of fuel from the secondary fuel tank to the primary fuel tank has been achieved. Specifically, the second fuel level indicator (e.g. 209) may be used to indicate fuel level in the secondary fuel tank, and once the second fuel level indicator reveals that all of the fuel in the secondary fuel tank has been transferred to the primary fuel tank, then it may be indicated that the transfer process has been completed.

Responsive to an indication that the entirety of fuel stored in the secondary fuel tank has been transferred to the primary fuel tank, method 400 may proceed to 445. At 445, method 400 may include commanding closed RV1 (e.g. 261), and may further include commanding open RV2 (e.g. 210). With RV1 commanded closed, it may be understood that fuel vapors and/or fuel may be prevented from flowing between the primary fuel tank and the secondary fuel tank. Furthermore, due to the check valve (e.g. 294) associated with the jet pump (e.g. 224), it may be further understood that fuel vapors and/or fuel may be prevented from traveling between the primary fuel tank and the secondary fuel tank by way of the conduit or hose (e.g. 293) associated with the jet pump.

Accordingly, it may be understood that responsive to all of the fuel in the secondary fuel tank having been transferred to the primary fuel tank, via the commanding closed of the RV1, the primary fuel tank may be sealed from the secondary fuel tank. Furthermore, in commanding open RV2, it may be understood that the secondary fuel tank may be coupled to the canister (e.g. 222) and to atmosphere, but that due to the RV1 being closed, the primary fuel tank may be maintained sealed from the canister and from atmosphere. Accordingly, by fluidically coupling the secondary fuel tank to the canister and to atmosphere, it may be understood that the secondary fuel tank may be maintained at or near atmospheric pressure when empty. In this way, the secondary fuel tank may be prevented from acting as a vapor holding tank, which may otherwise occur if the fuel system were configured as that depicted at FIG. 3, rather than that depicted at FIG. 2.

With all of the fuel stored in the secondary fuel tank having been transferred to the primary fuel tank, and with RV1 commanded closed and RV2 commanded open, method 400 may proceed to 450. At 450, method 400 may include indicating whether refueling is requested. As discussed above at 425, such a request may include an operator of the vehicle pressing a button on the dash or other actuator, to indicate the desire to refuel the saddle fuel tank. If, at 450, refueling is not requested, method 400 may continue to maintain RV1 closed and RV2 open. Alternatively, responsive to the request for refueling being received, method 400 may proceed to 455. At 455, method 400 may include commanding open RV1, and maintaining open RV2. By commanding open RV1, it may be understood that the primary fuel tank is depressurized via fuel vapors traveling from the primary fuel tank to the secondary fuel tank, and then to the canister by way of the open RV2. Because the secondary fuel tank was maintained at atmospheric pressure via the open RV2 and closed RV1 prior to the request for refueling, it may be understood that the secondary fuel tank is prevented from acting as a vapor holding tank, which may thereby result in faster fuel tank depressurization routines as opposed to other fuel system configurations where, even if secondary fuel tank is empty, the secondary fuel tank can store fuel vapors emanating from the primary fuel tank.

Proceeding to 460, method 400 may include monitoring pressure in the primary fuel tank. Responsive to pressure in the primary fuel tank dropping below the predetermined pressure threshold, method 400 may include proceeding to 465, where the refueling lock may be commanded open, as discussed above. Again, while not explicitly illustrated, it may be understood that during the process of refueling the saddle tank, RV1 and RV2 may be maintained open. Method 400 may then end.

Turning now to FIG. 5, an example timeline 500 is shown, depicting the controlling of fuel level in a saddle fuel tank (e.g. 250) such as that depicted at FIG. 2, as well as the controlling of refueling valves (e.g. RV1 and RV2) as a function of the fuel level and whether or not refueling is requested, according to the method of FIG. 4. Timeline 500 includes plot 505, indicating fuel level in the primary fuel tank, as monitored via the first fuel level sensor (e.g. 206), and plot 510, indicating fuel level in the secondary fuel tank, as monitored via the second fuel level sensor (e.g. 209), over time. Fuel level in the primary fuel tank and the secondary fuel tank may be anywhere from empty to 100% of capacity of each of the primary fuel tank and the secondary fuel tank. Timeline 500 further includes plot 515, indicating whether the jet pump (e.g. 224) is operating to transfer fuel from the secondary fuel tank to the primary fuel tank (on), or is off, over time. Timeline 500 further includes plot 520, indicating a status (open or closed) of RV1 (e.g. 261), plot 525, indicating a status (open or closed) of RV2 (e.g. 210), and plot 530, indicating a status (open or closed) of CVV (e.g. 214), over time. Timeline 500 further includes plot 535, indicating whether refueling is requested (yes or no), over time. Timeline 500 further includes plot 540, indicating pressure in the primary fuel tank, and plot 545, indicating pressure in the secondary fuel tank, over time. For both plots 540 and 545, pressure may be at atmospheric pressure, or greater than atmospheric pressure. Thus, although it is recognized that such fuel tanks may in some examples comprise a negative pressure with respect to atmospheric pressure, for the timeline 500 depicted at FIG. 5, pressure in each of the primary fuel tank and the secondary fuel tank may at atmospheric pressure or positive with respect to atmospheric pressure. Timeline 500 further includes plot 550, indicating whether the refueling lock (e.g. 245) is locked, or unlocked, over time.

At time t0, fuel level in the primary fuel tank (plot 505) is approximately 50% of capacity of the primary fuel tank. Furthermore, fuel level in the secondary fuel tank (plot 510) is approximately 50% of capacity of the secondary fuel tank. The jet pump is off (plot 515), RV1 is open (plot 520) and RV2 is closed (plot 525). Thus, it may be understood that at time t0 the primary fuel tank is fluidically coupled to the secondary fuel tank via the open RV1, and both the primary and the secondary fuel tanks are sealed from the canister and atmosphere via the closed RV2. The CVV is open (plot 530) at time t0.

Furthermore, at time t0, refueling is not requested (plot 535). As both the primary fuel tank and the secondary fuel tank are fluidically coupled via the open RV1, and are further sealed from atmosphere via the closed RV2, both the primary fuel tank and the secondary fuel tank have similar levels of positive pressure with respect to atmospheric pressure (refer to plots 540 and 545). Because refueling has not been requested, the refueling lock is locked at time t0 (plot 550).

At time t0, the controller (e.g. 212), based on the level of fuel indicated in the primary fuel tank and the secondary fuel tank, determines that all of the fuel currently stored in the secondary fuel tank may be transferred to the primary fuel tank without resulting in the level of fuel stored in the primary fuel tank to exceed 100% capacity of the primary fuel tank. Accordingly, at time t1, the jet pump is activated (plot 515). With the jet pump activated, fuel level in the primary fuel tank increases between time t1 and t2, whereas fuel level in the secondary fuel tank decreases between time t1 and t2, as the jet pump draws fuel from the secondary fuel tank and deposits the fuel into the primary fuel tank.

While the jet pump is activated, RV1 is maintained open (plot 520), RV2 is maintained closed (plot 525), and the CVV is maintained open (plot 530). With the jet pump transferring fuel from the secondary fuel tank to the primary fuel tank, pressure in the primary fuel tank increases (plot 540), while pressure in the secondary fuel tank decreases initially due to the act of drawing fuel out of the tank, but because RV1 is open, the pressure build in the primary fuel tank is communicated to the secondary fuel tank.

At time t2, the controller determines based on the second fuel level indicator (e.g. 209) that the secondary fuel tank has become depleted of fuel (plot 510), and that all of the fuel stored in the secondary fuel tank has been transferred to the primary fuel tank. Accordingly, at time t2, the jet pump is deactivated (plot 515). Furthermore, RV1 is commanded closed at time t2 (plot 520), while RV2 is commanded open (plot 525). In this way, the primary fuel tank is sealed from the secondary fuel tank via the closing of RV1, and the secondary fuel tank is fluidically coupled to atmosphere via the canister, due to the RV2 being commanded open. Between time t2 and t3, with the primary fuel tank sealed from the secondary fuel tank and from atmosphere, pressure builds slightly in the primary fuel tank. It may be understood that the pressure increase is due to the vehicle being in operation and propelled at least in part via the engine. While pressure increases in the primary fuel tank between time t2 and t3, pressure decreases in the secondary fuel tank between time t2 and t3, reaching atmospheric pressure by time t3 (plot 545), as the RV2 is open and thus the secondary fuel tank is in fluid communication with atmosphere. Furthermore, between time t2 and t3, fuel level in the primary fuel tank decreases slightly, as the fuel is used at least in part to propel the vehicle.

Between time t3 and t4, some amount of time elapses where the vehicle is driven some amount. Accordingly, at time t4, fuel level in the primary fuel tank has decreased (plot 505) as compared to the level indicated at time t3, whereas the secondary fuel tank remains empty (plot 510).

Between time t4 and t5, RV1 remains closed (plot 520) and RV2 remains open (plot 525). While not explicitly illustrated, between time t4 and t5, the vehicle is propelled at least in part via fuel in the primary fuel tank, and accordingly, fuel level in the primary fuel tank declines between time t4 and t5 (plot 505). At time t5, a request for refueling is received via the controller. While not explicitly illustrated, it may be understood that at time t5, the vehicle has stopped at a refueling station, hence the request for refueling being received at the controller. With the refueling request received at time t5, at time t6 the controller commands open RV1 (plot 520). With RV1 commanded open, pressure in the primary fuel tank declines between time t6 and t7, as represented by plot 540. Because pressure in the primary fuel tank is relived into the secondary fuel tank, pressure in the secondary fuel tank initially rises slightly before declining again toward atmospheric pressure (plot 545). Depicted for illustrative purposes is plot 542, represented as a dashed line. Specifically, plot 542 depicts depressurization if the secondary fuel tank were not maintained at atmospheric pressure prior to the request for refueling, but instead acted as a vapor holding tank, as discussed with regard to the fuel system and evaporative emissions system of FIG. 3. Said another way, the rate of depressurization is faster (compared plot 540 to plot 542) when the secondary fuel tank is maintained at atmospheric pressure and where depressurization is conducted by fluidically coupling the primary fuel tank to the secondary fuel tank (refer to plot 540 and the fuel system of FIG. 2), as opposed to a situation where the fuel system is of the variety depicted at FIG. 3, and where depressurization involves depressurizing both the primary fuel tank in addition to the secondary fuel tank that is acting as a vapor holding tank (refer to plot 542).

At time t7, pressure in the primary fuel tank reaches the predetermined pressure threshold, represented by dashed line 541. Accordingly, the primary fuel tank is sufficiently depressurized to enable fuel to be added to the saddle fuel tank, and thus the refueling lock is commanded unlocked (plot 550). Between time t7 and t8, refueling commences, and fuel level begins increasing in the primary fuel tank (plot 505). With fuel being added to the primary fuel tank, pressure in both the primary fuel tank and the secondary fuel tank rises (refer to plots 540 and 545, respectively), due to the primary fuel tank being fluidically coupled to the secondary fuel tank via the open RV1. While not explicitly illustrated, it may be understood that, as refueling continues, fuel may spill over from the primary fuel tank to the secondary fuel tank via the open RV1, such that both the primary fuel tank and the secondary fuel tank may be filled to a desired capacity.

While not explicitly illustrated, after refueling such a saddle fuel tank as that discussed above with regard to the timeline of FIG. 5, the methodology of FIG. 4, and the system of FIG. 2, control logic may dictate how the control RV1 and RV2 as a function of fuel level in the primary fuel tank and the secondary fuel tank as a function of the refueling event. Specifically, control logic may assess whether, based on the level of fuel in the primary fuel tank and the secondary fuel tank, whether all of the fuel from the secondary fuel tank may be transferred to the primary fuel tank without exceeding a capacity of the primary fuel tank. If so, then the jet pump may transfer all of the fuel stored in the secondary fuel tank to the primary fuel tank, and once the transfer is conducted, command closed the RV1 and command open the RV2, as discussed above. Alternatively, if there is a level of fuel in each of the primary fuel tank and the secondary fuel tank such that the entirety of fuel in the secondary fuel tank cannot be transferred to the primary fuel tank without exceeding the capacity of the primary fuel tank, then RV1 may be commanded or maintained open, but RV2 may be commanded closed, similar to that discussed above with regard to step 420 of method 400.

Thus, discussed herein, a method may comprise, responsive to a request for refueling a saddle fuel tank that includes a primary side and a secondary side, depressurizing the primary side to the secondary side, and commanding open a refueling lock coupled to the primary side to allow fuel to be delivered to the primary side in response to pressure in the primary side dropping below a threshold pressure.

For such a method, depressurizing the primary side to the secondary side may include commanding open a first refueling valve included in a conduit that couples the primary side to the secondary side.

For such a method, the method may further comprise selectively coupling the secondary side to a fuel vapor storage canister via a second refueling valve, and wherein the request for refueling may further comprise maintaining the second refueling valve in an open configuration during depressurizing the primary side to the secondary side.

For such a method, the request for refueling the saddle fuel tank may further comprise an indication that the secondary side is substantially devoid of fuel.

For such a method, the method may further comprise monitoring a first fuel amount in the primary side and monitoring a second fuel amount in the secondary side prior to the request for refueling. The method may further comprise transferring the second fuel amount to the primary side when it is determined that an entirety of the second fuel amount plus the first fuel amount equals or is below a capacity of the primary side. The method may further comprise sealing the primary side from the secondary side in response to the transferring. The method may further comprise sealing the secondary side from atmosphere prior to the transferring.

Another example of a method may comprise storing fuel for operating an engine of a vehicle in a primary side and a secondary side of a saddle fuel tank until preconditions are met, then transferring an entirety of fuel from the secondary side to the primary side, and responsive to the transfer of the entirety of the fuel, sealing the primary side from the secondary side and fluidically coupling the secondary side to a fuel vapor storage canister.

For such a method, the method may further comprise fluidically coupling the primary side to the secondary side when storing fuel in the primary side and the secondary side until the preconditions are met.

For such a method, the method may further include wherein the preconditions being met for transferring the entirety of the fuel from the secondary side to the primary side include a total level of fuel in the saddle fuel tank less than or equal to fifty percent of a capacity of the saddle fuel tank, and wherein the primary side and the secondary side each have a substantially similar capacity.

For such a method, the method may further comprise sealing the secondary side from the fuel vapor storage canister when storing fuel in the primary side and the secondary side until the preconditions are met.

For such a method, the method may further comprise responsive to a request for refueling the saddle fuel tank, unsealing the primary side from the secondary side to depressurize the primary side to the secondary side, and unlocking a refueling lock when pressure in the primary side decreases to below a threshold pressure.

For such a method, the method may further include wherein refueling the saddle fuel tank includes adding fuel to the saddle tank via a refueling port coupled to the primary side.

For such a method, the method may further include wherein transferring the entirety of fuel from the secondary side to the primary side is via a jet pump that draws fuel from the secondary side into a conduit that includes a check valve, and expels fuel via the conduit to the primary side, where the check valve opens in response to the jet pump being activated and closes in response to the jet pump being deactivated.

For such a method, the method may further include wherein the primary side includes a fuel pump that supplies fuel from the primary side to the engine for combustion.

It is herein recognized that in some examples RV1 and/or RV2 may become degraded. For example, if RV1 becomes degraded such that it does not properly seal, then the ability to seal the primary fuel tank (e.g. 253) from the secondary fuel tank (e.g. 240) may become compromised. Similarly, if the RV2 becomes degraded such that it does not properly seal, then the ability to seal the secondary fuel tank from the canister (e.g. 222) may become compromised. In some examples, it may be difficult to determine whether a failing test for presence or absence of undesired evaporative emissions is due to a degraded valve, or a different source of undesired evaporative emissions.

Accordingly, turning to FIG. 6, an example method 600 is depicted, detailing methodology for inferring whether RV1 and/or RV2 are degraded. Briefly, method 600 may be used under conditions where RV2 is closed but RV1 is open, to determine whether RV2 is degraded and not sealing properly, and may further be used under conditions where RV1 is closed but RV2 is open, to determine whether RV1 is degraded and not sealing properly. In each of the above conditions, canister temperature change may be used as a readout for determining whether or not RV1 and/or RV2 are degraded, as will be elaborated in further detail below.

Method 600 will be described with reference to the systems described herein and shown in FIGS. 1-2, though it will be appreciated that similar methods may be applied to other systems without departing from the scope of this disclosure. Instructions for carrying out method 600 and the rest of the methods included herein may be executed by a controller, such as controller 212 of FIG. 2, based on instructions stored in non-transitory memory, and in conjunction with signals received from sensors of the engine system, such as temperature sensors, pressure sensors, and other sensors described in FIGS. 1-2. The controller may employ actuators such as RV1 (e.g. 261), RV2 (e.g. 210), CVV (e.g. 214), CPV (e.g. 260), jet pump (e.g. 224), fuel pump (e.g. 221), etc., to alter states of devices in the physical world according to the methods depicted below.

Method 600 begins at 605 and includes indicating whether RV1 is open and RV2 is closed. Such a circumstance may occur when there is fuel in both the primary fuel tank (e.g. 253) and the secondary fuel tank (e.g. 240), as discussed above. If such a circumstance is not indicated, method 600 may proceed to 610. At 610, method 600 may include indicating whether RV2 is open, and where RV1 is closed. Such a circumstance may occur when the fuel from the secondary fuel tank has been transferred over to the primary fuel tank, as discussed above. If, at 610, it is further indicated that RV2 is not open with RV1 closed, then method 600 may end, as in a case where both RV1 and RV2 are open, for example, may comprise a refueling event that is not suitable for determining whether RV1 and/or RV2 are degraded.

Returning to 610, responsive to an indication that RV2 is open and RV1 is closed, method 600 may proceed to 615. At 615, method 600 may include indicating whether conditions are met for monitoring canister temperature in order to indicate whether RV1 is degraded. Conditions being met may include an indication of pressure in the primary fuel tank greater than a primary fuel tank pressure threshold. The primary fuel tank pressure threshold may comprise a non-zero, positive value that is of a magnitude sufficient for detecting canister temperature change if RV1 is not sealing properly. Conditions being met may additionally or alternatively include an indication that canister loading state is below a canister loading state threshold, such that additional loading of the canister may register as a temperature change of the canister. Conditions being met may additionally or alternatively include an indication that there is not a canister purging operation in progress. In some examples, conditions being met may comprise an indication that the entirety of fuel from the secondary fuel tank has just been transferred over to the primary fuel tank, such that the addition of fuel to the primary fuel tank generates pressure and fuel vapor, and that the RV1 has been commanded closed.

If, at 615, conditions are not indicated to be met, method 600 may end. Alternatively, method 600 may proceed to 620. At 620, method 600 may include monitoring canister temperature change via, for example, the canister temperature sensor (e.g. 297), for a predetermined duration. The predetermined duration may comprise 3 minutes or less, 5 minutes or less, 10 minutes or less, etc. For example, canister temperature may be recorded prior to conducting the diagnostic to obtain a baseline canister temperature, and then canister temperature may again be recorded to conduct the diagnostic. As such, proceeding to 625, method 600 may include indicating whether canister temperature change is greater than a canister temperature change threshold. The canister temperature change threshold may comprise a non-zero threshold temperature increase, for example. The canister temperature change threshold may comprise a temperature change of 1° F., 2° F., 3° F., etc.

If, at 625, it is indicated that the monitored canister temperature change exceeds the canister temperature change threshold, then method 600 may proceed to 630, where RV1 degradation is indicated. Such a result may be stored at the controller. Specifically, it may be understood that RV1 degradation may be indicated at 630 because with RV2 open and RV1 commanded closed, fuel vapors would have had to pass through the commanded closed RV1 in order to reach the canister and effect the resultant canister temperature change. Thus, in such an example, RV1 may be degraded such that RV1 is not effectively sealing the primary fuel tank from the secondary fuel tank.

Proceeding to 640, method 600 may include updating vehicle operating parameters. Specifically, a malfunction indicator light (MIL) may be illuminated at the vehicle dash, alerting the vehicle operator of a request to service the vehicle to address the degraded RV1. In some examples, updating vehicle operating parameters in response to the degraded RV1 may include not transferring the fuel from the secondary fuel tank to the primary fuel tank when conditions would otherwise be met for doing so (refer to step 410), since the RV1 is degraded and is not preventing vapors from being communicated from the primary fuel tank to the secondary fuel tank. In such an example, the RV2 may be relied upon for sealing the saddle fuel tank from the canister and RV1 may be left open. Method 600 may then end.

Returning to 625, in response to canister temperature change not being greater than the canister temperature change threshold, method 600 may proceed to 635. At 635, method 600 may include indicating that RV1 is functioning as desired. Such a result may be stored at the controller, for example, and as will be discussed in further detail below, may be relied upon for entering into a test for presence or absence of undesired evaporative emissions. Method 600 may then proceed to 640, where updating vehicle operating parameters may include maintaining the methodology of transferring fuel from the secondary fuel tank to the primary fuel tank, discussed above with regard to FIG. 4, since RV1 is indicated to be functioning as desired to seal the primary fuel tank from the secondary fuel tank, provided RV2 is also functioning as desired. Method 600 may then end.

Returning to 605, responsive to an indication that RV1 is open and RV2 is closed, method 600 may proceed to 645. At 645, method 600 may include indicating whether conditions are met for monitoring canister temperature in order to indicate whether RV2 is degraded and not sealing properly. Conditions being met may include an indication of pressure in the primary fuel tank and the secondary fuel tank greater than a combined fuel tank pressure threshold. The combined fuel tank pressure threshold may comprise a non-zero, positive value that is of a magnitude sufficient for detecting canister temperature change if RV2 is not sealing properly. Conditions being met may additionally or alternatively include an indication that canister loading state is below a canister loading state threshold, such that additional loading of the canister may register as a temperature change of the canister. Conditions being met may additionally or alternatively include an indication that there is not a canister purging operation in progress.

If, at 645, conditions are not indicated to be met, method 600 may end. Otherwise, method 600 may proceed to 650, where method 600 may include monitoring canister temperature over the predetermined duration, similar to that discussed above with regard to step 625 of method 600. Again, the predetermined duration may comprise 3 minutes or less, 5 minutes or less, 10 minutes or less, etc. For example, canister temperature may be recorded prior to conducting the diagnostic to obtain a baseline canister temperature, and then canister temperature may again be recorded to conduct the diagnostic. As such, proceeding to 655, method 600 may include indicating whether canister temperature change is greater than a canister temperature change threshold. The canister temperature change threshold may comprise a non-zero threshold temperature increase, for example. The canister temperature change threshold may comprise a temperature change of 1° F., 2° F., 3° F., etc.

If, at 655, it is indicated that the monitored canister temperature change exceeds the canister temperature change threshold, then method 600 may proceed to 660, where RV2 degradation is indicated. Such a result may be stored at the controller. Specifically, it may be understood that RV2 degradation may be indicated at 660 because with RV2 closed and RV1 commanded open, fuel vapors would have had to pass through the commanded closed RV2 in order to reach the canister and effect the resultant canister temperature change. Thus, in such an example, RV2 may be degraded such that RV2 is not effectively sealing the primary fuel tank from the secondary fuel tank.

Proceeding to 640, method 600 may include updating vehicle operating parameters. Specifically, a malfunction indicator light (MIL) may be illuminated at the vehicle dash, alerting the vehicle operator of a request to service the vehicle to address the degraded RV2. In some examples, updating vehicle operating parameters in response to the degraded RV2 may include communicating a message (e.g. via a human machine interface associated with the vehicle dash, a text message to a vehicle operator's phone, an email, an audible message, etc.) to the vehicle operator that it may be desirable to avoid filling the secondary fuel tank with fuel, such that the non-degraded RV1 (provided the RV1 is non-degraded), may be used to seal the saddle fuel tank under conditions where RV2 is degraded. In such an example, similar methodology may be relied upon as discussed above with regard to FIG. 4, where as soon as the entirety of fuel from the secondary fuel tank may be transferred to the primary fuel tank, such action is taken, and then RV1 may be commanded closed. In this way, canister loading may be avoided as much as possible, even under circumstances where the RV2 is not sealing as desired or expected. However, by requesting the vehicle operator to avoid adding fuel to a level that fills the secondary fuel tank to an appreciable level, RV1 may be relied upon for sealing the primary fuel tank from the canister under conditions where RV2 is degraded, without concern for fuel in the secondary fuel tank.

Returning to 655, responsive to canister temperature change not being greater than the canister temperature change threshold, method 600 may proceed to 665. At 665, method 600 may include indicating that RV2 is functioning as desired or expected, or in other words, is effectively sealing the secondary fuel tank from the canister. Such a result may be stored at the controller, for example, and as will be discussed in further detail below, may be relied upon for entering into a test for presence or absence of undesired evaporative emissions. Method 600 may then proceed to 640, where updating vehicle operating parameters may include maintaining conducting the methodology of transferring fuel from the secondary fuel tank to the primary fuel tank, discussed above with regard to FIG. 4, since RV2 is indicated to be functioning as desired to seal the primary fuel tank from the secondary fuel tank, provided RV1 is also functioning as desired. Method 600 may then end.

The diagnosing of whether RV1 and/or RV2 are degraded or not may be relied upon as entry conditions into conducting a test for presence or absence of undesired evaporative emissions stemming from the primary fuel tank, secondary fuel tank, and/or evaporative emissions system. For example, as discussed above, diagnostics for determining presence or absence of sources of undesired evaporative emissions may include applying vacuum on the fuel system and/or evaporative emissions system, and responsive to a predetermined vacuum being reached, sealing the fuel system and/or evaporative emissions system and monitoring pressure bleedup in order to indicate the presence or absence of undesired evaporative emissions. It is herein recognized that for a fuel system and evaporative emissions system such as that depicted at FIG. 2, there may be opportunity to conduct such a test where a source of undesired evaporative emissions may be pinpointed to being located in the primary fuel tank, secondary fuel tank, and/or evaporative emissions system. However, interpretation of results of such a diagnostic as that which will be discussed below with regard to FIG. 7, may be complicated if it is not known whether or not RV1 and/or RV2 are functioning as desired, or in other words, sealing as expected. Accordingly, by conducting the diagnostic discussed with regard to FIG. 6, the results of the test for presence or absence of undesired evaporative emissions may have increased robustness and accuracy.

Accordingly, turning to FIG. 7, an example method 700 is depicted, detailing methodology for conducting a test for presence or absence of undesired evaporative emissions stemming from one or more of the primary fuel tank (e.g. 253), secondary fuel tank (e.g. 240) and/or evaporative emissions system (e.g. 255). Specifically, a vacuum pump (e.g. 289) may be used to simultaneously evacuate each of the primary fuel tank, secondary fuel tank, and evaporative emissions system by commanding open RV1 and RV2, and activating the vacuum pump. Then, responsive to a desired or threshold vacuum being reached, method 700 may include commanding closed each of RV1 and RV2, and simultaneously monitoring pressure bleedup independently in each of the primary fuel tank, secondary fuel tank, and evaporative emissions system. In this way, provided that it is known that both RV1 and RV2 are not degraded, the methodology of FIG. 7 may be used to pinpoint whether a source of undesired evaporative emissions is present in one or more of the primary fuel tank, secondary fuel tank, and/or evaporative emissions system. By pinpointing where such sources of undesired evaporative emissions are stemming from, time spent diagnosing repairs may be reduced, thus reducing costs associated with such diagnosis. It may be understood that such a method relates to a fuel system and evaporative emissions system as that discussed with regard to FIG. 2.

Method 700 will be described with reference to the systems described herein and shown in FIGS. 1-2, though it will be appreciated that similar methods may be applied to other systems without departing from the scope of this disclosure. Instructions for carrying out method 700 and the rest of the methods included herein may be executed by a controller, such as controller 212 of FIG. 2, based on instructions stored in non-transitory memory, and in conjunction with signals received from sensors of the engine system, such as temperature sensors, pressure sensors, and other sensors described in FIGS. 1-2. The controller may employ actuators such as RV1 (e.g. 261), RV2 (e.g. 210), CVV (e.g. 214), CPV (e.g. 260), vacuum pump (e.g. 289), etc., to alter states of devices in the physical world according to the methods depicted below.

Method 700 begins at 705, and may include evaluating current vehicle operating conditions. Operating conditions may be estimated, measured, and/or inferred, and may include one or more vehicle conditions, such as vehicle speed, battery state of charge, etc., various engine conditions, such as engine status (on or off), engine load, engine temperature, engine speed, torque demand, exhaust air-fuel ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 710, method 700 may include indicating whether conditions are met for conducting a test for presence or absence of undesired evaporative emissions stemming from the primary fuel tank, secondary fuel tank and/or evaporative emissions system. As one example, conditions being met at 710 may include an indication that RV1 and RV2 are functioning as desired, information of which may be obtained by conducting the methodology of FIG. 6 as discussed above. Conditions being met at 710 may additionally or alternatively include an indication that a canister purging event is not currently in progress. Conditions being met at 710 may additionally or alternatively include an indication that a refueling event is not currently in progress. Conditions being met at 710 may in some examples additionally or alternatively include an indication that the vehicle is stationary, however in other examples, conditions being met may include an indication that the vehicle is in motion, without departing from the scope of this disclosure. Conditions being met at 710 may include an indication that fuel vaporization is below a predetermined fuel vaporization rate threshold. For example, fuel vaporization rate may be inferred as a function of fuel level, fuel temperature, fuel tank pressure and/or reid vapor pressure of fuel in the tanks. If fuel vaporization rate is greater than the predetermined fuel vaporization rate threshold, then the pressure bleedup phase of the diagnostic may be adversely impacted due to fuel vaporizing, thus it may be desirable to conduct the diagnostic for presence or absence of undesired evaporative emissions when fuel vaporization rate is below the fuel vaporization rate threshold. The fuel vaporization rate threshold may be stored at the controller, for example.

If, at 710, conditions are not indicated to be met for conducting the test for presence or absence of undesired evaporative emissions (also referred to herein as EVAP test), then method 700 may proceed to 715. At 715, method 700 may include maintaining current operating conditions. For example, if the engine is in operation to propel the vehicle, then such operation may be maintained without conducting the test diagnostic. If the vehicle is being propelled via battery power, or at least in part via battery power, then such operation may be maintained without conducting the test diagnostic. Such examples are meant to be illustrative. Method 700 may then end.

Returning to 710, responsive to an indication that conditions are met for conducting the test for presence or absence of undesired evaporative emissions, method 700 may proceed to 720. At 720, method 700 may include commanding open or maintaining open each of RV1 (e.g. 261) and RV2 (e.g. 210). Method 700 may then proceed to 725, where method 700 may include commanding closed the CVV (e.g. 214) and commanding closed or maintaining closed the CPV (e.g. 260). Continuing to 730, method 700 may include activating the vacuum pump (e.g. 289) to draw a negative pressure with respect to atmospheric pressure on the saddle fuel tank (e.g. each of primary fuel tank and secondary fuel tank) and evaporative emissions system. While this example methodology relates to using the vacuum pump to conduct the evacuation step, in other examples, engine manifold vacuum may be relied upon without departing from the scope of this disclosure. In an example where engine manifold vacuum is used, the difference is that the CPV would be commanded open to impart the intake manifold vacuum on the fuel system and evaporative emissions system, and when the threshold vacuum is reached, the CPV would be commanded closed.

Accordingly, with the vacuum pump activated at 730, method 700 may proceed to 735. At 735, method 700 may include indicating whether the threshold vacuum has been reached. For this, each of, or one or more of, the primary fuel tank pressure sensor (e.g. 220), secondary fuel tank pressure sensor (e.g. 233) and/or evaporative emissions system pressure sensor (e.g. 232) may be relied upon. Responsive to the threshold vacuum having been reached at 735, method 700 may proceed to 740. At 740, method 700 may include commanding closed RV1 and RV2. By commanding closed RV1 and RV2, it may be understood that the primary fuel tank is sealed from the secondary fuel tank, which is further sealed from the evaporative emissions system. Because each of the primary fuel tank, secondary fuel tank, and evaporative emissions system include pressure sensors, pressure bleedup may independently be monitored in each of primary fuel system, secondary fuel system and evaporative emissions system, as indicated at step 745. The pressure in each of the primary fuel system, secondary fuel system and evaporative emissions system may be monitored for a predetermined duration (e.g. 1 minute, 2 minutes, 3 minutes, 4 minutes, 5 minutes, 6 minutes, etc.).

Responsive to the predetermined duration elapsing, method 700 may proceed to 750. At 750, method 700 may include comparing pressure bleedup in each of the primary fuel tank, secondary fuel tank, and evaporative emissions to predetermined threshold for each. In other words, it may be understood that there may be a first predetermined bleedup threshold and/or first predetermined bleedup rate threshold for the primary fuel tank, a second predetermined bleedup threshold and/or second predetermined bleedup rate threshold for the secondary fuel tank, and a third predetermined bleedup threshold and/or third predetermined bleedup rate threshold for the evaporative emissions system. The predetermined thresholds for the primary fuel tank and the secondary fuel tank may be based at least in part on one or more of fuel level, fuel tank temperature, fuel temperature, ambient temperature, volume of fuel tank, etc. The predetermined thresholds for the evaporative emissions system may be independent of the variables discussed above related to fuel tank parameters, but may be a function of one or more of ambient temperature, canister temperature and/or canister loading state, etc. The controller may rely on one or more lookup tables stored at the controller in order to retrieve the predetermined thresholds for each of the primary fuel tank, secondary fuel tank and evaporative emissions system.

Proceeding to 755, method 700 may include indicating whether one or more of the primary fuel tank, secondary fuel tank and/or evaporative emissions system includes a source of a presence of undesired evaporative emissions. For example, if the rate of pressure bleedup in the primary fuel tank is faster than the first pressure bleedup rate threshold, then a source of undesired evaporative emissions may be indicated for the primary fuel tank. Likewise, if the rate of pressure bleedup in the secondary fuel tank is faster than the second pressure bleedup rate threshold, then a source of undesired evaporative emissions may be indicated for the secondary fuel tank. Along similar lines, if the rate of pressure bleedup in the evaporative emissions system is faster than the third pressure bleedup rate threshold, then a source of undesired evaporative emissions may be indicated for the evaporative emissions system.

Responsive to identifying if and where a source of undesired evaporative emissions is stemming from with regard to the primary fuel tank, secondary fuel tank and evaporative emissions system, method 700 may proceed to 760. At 760, method 700 may include updating vehicle operating parameters. Specifically, updating vehicle operating parameters at 760 may include storing the results of the diagnostic at the controller, and if any sources of undesired evaporative emissions were identified, setting an appropriate MIL to indicate to the vehicle operator a request to have the vehicle serviced. Method 700 may then end.

In this way, for vehicles with a saddle fuel tank that includes a primary fuel tank and secondary fuel tank, the secondary fuel tank may be prevented from acting as a holding tank for fuel vapor, and accordingly, fuel tank depressurization routines for such tanks in response to requests for refueling, may be improved, which may improve customer satisfaction.

The technical effect is that by including a first refueling valve in a conduit that fluidically couples the primary fuel tank to a secondary fuel tank of a saddle fuel tank, and by moving the load conduit that couples the saddle fuel tank to a fuel vapor canister to stemming from the secondary fuel tank instead of the primary fuel tank and including a second refueling valve, saddle fuel tank depressurization rates may be improved. A related technical effect is that by including a check valve in a jet pump conduit of the above-described saddle fuel tank, fuel vapors and/or fuel may be prevented from traveling from the primary fuel tank to the secondary fuel tank. Yet another technical effect is that for the saddle fuel tank described above, by transferring an entirety of the fuel stored in the secondary tank to the primary tank when possible and then sealing the primary fuel tank from the secondary fuel tank and fluidically coupling the secondary fuel tank to the evaporative emissions system, the secondary fuel tank may be maintained at atmospheric pressure when devoid of fuel and may thus be prevented from acting as a vapor holding tank. Thus, yet another technical effect is that responsive to a refueling request, by commanding open the first refueling valve, the primary fuel tank may be depressurized to the secondary fuel tank which is already at atmospheric pressure, which may increase rates at which the primary fuel tank, and thus the saddle fuel tank overall, is depressurized to enable refueling to commence.

Thus, the systems and methods discussed herein may enable one or more systems and one or more methods. In one example, a method comprises responsive to a request for refueling a saddle fuel tank that includes a primary side and a secondary side, depressurizing the primary side to the secondary side, and commanding open a refueling lock coupled to the primary side to allow fuel to be delivered to the primary side in response to pressure in the primary side dropping below a threshold pressure. In a first example of the method, the method further includes wherein depressurizing the primary side to the secondary side includes commanding open a first refueling valve included in a conduit that couples the primary side to the secondary side. A second example of the method optionally includes the first example, and further comprises selectively coupling the secondary side to a fuel vapor storage canister via a second refueling valve; and wherein the request for refueling further comprises maintaining the second refueling valve in an open configuration during depressurizing the primary side to the secondary side. A third example of the method optionally includes any one or more or each of the first through second examples, and further includes wherein the request for refueling the saddle fuel tank further comprises an indication that the secondary side is substantially devoid of fuel. A fourth example of the method optionally includes any one or more or each of the first through third examples, and further comprises monitoring a first fuel amount in the primary side and monitoring a second fuel amount in the secondary side prior to the request for refueling; and transferring the second fuel amount to the primary side when it is determined that an entirety of the second fuel amount plus the first fuel amount equals or is below a capacity of the primary side. A fifth example of the method optionally includes any one or more or each of the first through fourth examples, and further comprises sealing the primary side from the secondary side in response to the transferring. A sixth example of the method optionally includes any one or more or each of the first through fifth examples, and further comprises sealing the secondary side from atmosphere prior to the transferring.

Another example of a method comprises storing fuel for operating an engine of a vehicle in a primary side and a secondary side of a saddle fuel tank until preconditions are met, then transferring an entirety of fuel from the secondary side to the primary side; and responsive to the transfer of the entirety of the fuel, sealing the primary side from the secondary side and fluidically coupling the secondary side to a fuel vapor storage canister. In a first example of the method, the method further comprises fluidically coupling the primary side to the secondary side when storing fuel in the primary side and the secondary side until the preconditions are met. A second example of the method optionally includes the first example, and further includes wherein the preconditions being met for transferring the entirety of the fuel from the secondary side to the primary side include a total level of fuel in the saddle fuel tank less than or equal to fifty percent of a capacity of the saddle fuel tank; and wherein the primary side and the secondary side each have a substantially similar capacity. A third example of the method optionally includes any one or more or each of the first through second examples, and further comprises sealing the secondary side from the fuel vapor storage canister when storing fuel in the primary side and the secondary side until the preconditions are met. A fourth example of the method optionally includes any one or more or each of the first through third examples, and further comprises responsive to a request for refueling the saddle fuel tank, unsealing the primary side from the secondary side to depressurize the primary side to the secondary side; and unlocking a refueling lock when pressure in the primary side decreases to below a threshold pressure. A fifth example of the method optionally includes any one or more or each of the first through fourth examples, and further includes wherein refueling the saddle fuel tank includes adding fuel to the saddle tank via a refueling port coupled to the primary side. A sixth example of the method optionally includes any one or more or each of the first through fifth examples, and further includes wherein transferring the entirety of fuel from the secondary side to the primary side is via a jet pump that draws fuel from the secondary side into a conduit that includes a check valve, and expels fuel via the conduit to the primary side, where the check valve opens in response to the jet pump being activated and closes in response to the jet pump being deactivated. A seventh example of the method optionally includes any one or more or each of the first through sixth examples, and further includes wherein the primary side includes a fuel pump that supplies fuel from the primary side to the engine for combustion.

An example of a system for a vehicle comprises a saddle fuel tank including a primary side and a secondary side, the primary side further including a refueling port and a refueling lock that, when locked, prevents fuel from being added to the primary side via the refueling port; a fuel tank pressure sensor for monitoring pressure in the primary side; and a controller with computer readable instructions stored on non-transitory memory that when executed, cause the controller to: responsive to receiving a request to refuel the saddle fuel tank, command the primary side fluidically coupled to the secondary side to depressurize the primary side; monitor the pressure in the primary side; and unlock the refueling lock in response to the pressure in the primary side becoming within a threshold pressure of atmospheric pressure. In a first example of the system, the system further comprises a first refueling valve included in a conduit that couples the primary side to the secondary side; and wherein the controller stores instructions to command open the first refueling valve to fluidically couple the primary side to the secondary side to depressurize the primary side. A second example of the system optionally includes the first example, and further comprises a load conduit stemming from the secondary side that couples the secondary side to a fuel vapor storage canister, the load conduit further including a second refueling valve; and wherein the controller stores further instructions to maintain open the second refueling valve responsive to receiving the request for refueling. A third example of the system optionally includes any one or more or each of the first through second examples, and further comprises a jet pump for transferring fuel from the secondary side to the primary side, the jet pump further comprising a check valve that closes to prevent fuel and/or vapors from being transferred from the primary side to the secondary side when the jet pump is off. A fourth example of the system optionally includes any one or more or each of the first through third examples, and further comprises a first fuel level sensor positioned in the primary side and a second fuel level sensor positioned in the secondary side; wherein the controller stores further instructions to, prior to receiving the request to refueling the saddle fuel tank, monitor a first fuel amount in the primary side and a second fuel amount in the secondary side; and activate the jet pump to transfer all of the second fuel amount to the primary side when it is indicated that all of the second fuel amount can be transferred to the primary side without overwhelming a capacity of the primary side.

In another representation, a method comprises, in a first condition, fluidically coupling a primary fuel tank of a saddle fuel tank to a secondary fuel tank of the saddle fuel tank and sealing the secondary fuel tank from an evaporative emissions system, and in a second condition, sealing the primary fuel tank from the secondary fuel tank and fluidically coupling the secondary fuel tank to the evaporative emissions system; and responsive to a refueling request received during the first condition, unsealing the secondary fuel tank from the evaporative emissions system and maintaining the primary fuel tank fluidically coupled to the secondary fuel tank, and responsive to the refueling request received during the second condition, coupling the primary fuel tank to the secondary fuel tank and maintaining the secondary fuel tank fluidically coupled to the evaporative emissions system.

In such a method, the first condition may further comprise a total level of fuel stored in the saddle fuel tank that is greater than an amount of fuel tank can be held in the primary fuel tank, and the second condition may further comprise a total level of fuel stored in the saddle fuel tank that can all be stored in the primary fuel tank.

In such a method, the second condition may further comprise activating a jet pump to transfer an entirety of fuel stored in the secondary fuel tank to the primary fuel tank to the primary fuel tank, and then sealing the primary fuel tank from the secondary fuel tank and fluidically coupling the secondary fuel tank to the evaporative emissions system.

In such a method, the method may further include wherein the secondary fuel tank is at atmospheric pressure at a time of the refueling request, and wherein the primary fuel tank is at a positive pressure with respect to atmospheric pressure.

In such a method, fluidically coupling the primary fuel tank to the secondary fuel tank further comprises commanding open a first refueling valve included in a conduit that couples the primary fuel tank to the secondary fuel tank, and wherein sealing the primary fuel tank from the secondary fuel tank further comprises commanding closed the first refueling valve.

In such a method, sealing the secondary fuel tank from the evaporative emissions system further comprises commanding closed a second refueling valve included in a load conduit that couples the secondary fuel tank to a fuel vapor storage canister positioned in the evaporative emissions system, and wherein fluidically coupling the secondary fuel tank to the evaporative emissions system further comprises commanding open the second refueling valve.

In such a method, the method may further comprise, responsive to the refueling request during the first condition and the second condition, monitoring a pressure in the primary fuel tank and commanding open a refueling lock in response to the pressure in the primary fuel tank decreasing to below a threshold pressure.

In such a method, refueling the saddle fuel tank may further comprise delivering fuel to the primary fuel tank via a refueling port that is coupled to the primary fuel tank.

In yet another representation, a method comprises, in a first condition, commanding closed a first refueling valve positioned in a conduit that couples a primary fuel tank of a saddle fuel tank to a secondary fuel tank of the saddle fuel tank, and commanding open a second refueling valve that is positioned in a load conduit that couples the secondary fuel tank to a fuel vapor storage canister; in a second condition, commanding open the first refueling valve and commanding closed the second refueling valve; monitoring a temperature change of the fuel vapor storage canister in both the first condition and the second condition; and responsive to the temperature change greater than a threshold during the first condition, indicating degradation of the first refueling valve, and responsive to the temperature change greater than the threshold during the second condition, indicating degradation of the second refueling valve.

In such a method, the temperature change may be monitored via one or more temperature sensor(s) coupled to the fuel vapor storage canister.

In yet another representation, a method comprises, evacuating an evaporative emissions system and fuel system, the evaporative emissions system including a fuel vapor storage canister and the fuel system comprising a saddle fuel tank with a primary fuel tank and a secondary fuel tank, where the evacuating includes commanding open a first refueling valve that couples the primary fuel tank to the secondary fuel tank and commanding open a second refueling valve that couples the secondary fuel tank to the fuel vapor storage canister; and responsive to a threshold negative pressure with respect to atmosphere being attained in the evaporative emissions system and the fuel system, commanding closed each of the first refueling valve and the second refueling valve, and monitoring a first pressure bleedup in the primary fuel tank, a second pressure bleedup in the secondary fuel tank, and a third pressure bleedup in the evaporative emissions system to indicate a presence or absence of degradation in one or more of the primary fuel tank, the secondary fuel tank and/or the evaporative emissions system.

In such a method, the evacuating may include activating a vacuum pump positioned in a conduit that stems from a vent line that couples the fuel vapor storage canister to atmosphere. In such a method, evacuating the evaporative emissions system and the fuel system may further comprise commanding closed a canister vent valve included in the vent line, and sealing an engine from the evaporative emissions system.

In such a method, the evacuating may include communicating intake manifold vacuum from the engine to the evaporative emissions system and the fuel system. In such a method, the method may include fluidically coupling the engine to the evaporative emissions system and the fuel system, and may further include commanding closed the canister vent valve.

In such a method, the first pressure bleedup may be compared to a first pressure bleedup threshold, the second pressure bleedup may be compared to a second pressure bleedup threshold, and the third pressure bleedup may be compared to a third pressure bleedup threshold. In such a method, the first pressure bleedup threshold, the second pressure bleedup threshold and the third pressure bleedup threshold may each comprise different thresholds. Alternatively, in such a method, the first pressure bleedup threshold, the second pressure bleedup threshold and the third pressure bleedup threshold may comprise the same thresholds.

In such a method, the first pressure bleedup threshold and the second pressure bleedup threshold may be a function of a first fuel level in the primary fuel tank, and a second fuel level in the secondary fuel tank, respectively. In such a method, the third pressure bleedup threshold may be independent of fuel level in the saddle fuel tank.

In such a method, the evacuating may further comprise an indication that the first refueling valve and the second refueling valve are functioning as desired or expected.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   storing fuel for operating an engine of a vehicle in a primary side and a secondary side of a saddle fuel tank until preconditions are met, then transferring an entirety of fuel from the secondary side to the primary side; and
   responsive to the transfer of the entirety of the fuel, sealing the primary side from the secondary side and fluidically coupling the secondary side to a fuel vapor storage canister.

2. The method of claim 1, further comprising fluidically coupling the primary side to the secondary side when storing fuel in the primary side and the secondary side until the preconditions are met.

3. The method of claim 1, wherein the preconditions being met for transferring the entirety of the fuel from the secondary side to the primary side include a total level of fuel in the saddle fuel tank less than or equal to fifty percent of a capacity of the saddle fuel tank; and
   wherein the primary side and the secondary side each have a substantially similar capacity.

4. The method of claim 1, further comprising sealing the secondary side from the fuel vapor storage canister when storing fuel in the primary side and the secondary side until the preconditions are met.

5. The method of claim 1, further comprising:
   responsive to a request for refueling the saddle fuel tank, unsealing the primary side from the secondary side to depressurize the primary side to the secondary side; and
   unlocking a refueling lock when pressure in the primary side decreases to below a threshold pressure.

6. The method of claim 5, wherein refueling the saddle fuel tank includes adding fuel to the saddle tank via a refueling port coupled to the primary side.

7. The method of claim 1, wherein transferring the entirety of fuel from the secondary side to the primary side is via a jet pump that draws fuel from the secondary side into a conduit that includes a check valve, and expels fuel via the conduit to the primary side, where the check valve opens in response to the jet pump being activated and closes in response to the jet pump being deactivated.

8. The method of claim 1, wherein the primary side includes a fuel pump that supplies fuel from the primary side to the engine for combustion.

* * * * *